United States Patent
Jeong et al.

(10) Patent No.: US 11,217,234 B2
(45) Date of Patent: Jan. 4, 2022

(54) INTELLIGENT VOICE RECOGNIZING METHOD, APPARATUS, AND INTELLIGENT COMPUTING DEVICE

(71) Applicant: LG ELECTRONICS INC., Seoul (KR)

(72) Inventors: Jaewoong Jeong, Seoul (KR); Youngman Kim, Seoul (KR); Sangjun Oh, Seoul (KR); Kyuho Lee, Seoul (KR); Seunghyun Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 169 days.

(21) Appl. No.: 16/576,539

(22) Filed: Sep. 19, 2019

(65) Prior Publication Data

US 2020/0013394 A1    Jan. 9, 2020

(30) Foreign Application Priority Data

Aug. 30, 2019    (KR) .......................... 10-2019-0107795

(51) Int. Cl.
*G10L 15/22*     (2006.01)
*G10L 15/20*     (2006.01)
(Continued)

(52) U.S. Cl.
CPC .............. *G10L 15/20* (2013.01); *G10L 15/30* (2013.01); *G10L 25/84* (2013.01)

(58) Field of Classification Search
None
See application file for complete search history.

(56) References Cited

U.S. PATENT DOCUMENTS 6,253,175 B1 *   6/2001   Basu ........................ G10L 15/02
                                                          704/231
10,397,749 B1 *  8/2019   Barua ...................... H04W 4/06
(Continued)

FOREIGN PATENT DOCUMENTS

JP      2006-145694 A      6/2006
KR      10-1698369 B1      1/2017
KR      10-2019-0075017 A  6/2019

*Primary Examiner* — Daniel C Washburn
*Assistant Examiner* — Athar N Pasha
(74) *Attorney, Agent, or Firm* — Birch, Stewart, Kolasch & Birch, LLP

(57) ABSTRACT

Disclosed herein is a method for intelligently recognizing voice by a voice recognizing apparatus in various noise environments. The method includes acquiring a first noise level for an environment in which the voice recognizing apparatus is located, inputting the first noise level into a previously learned noise-sensitivity model to acquire a first optimum sensitivity, and recognizing a user's voice based on the first optimum sensitivity. The noise-sensitivity model is learned in a plurality of noise environments acquiring different noise levels, so that it is possible to accurately acquire an optimum sensitivity corresponding to a noise level depending on an operating state when an IoT device (voice recognizing apparatus) is in operation. At least one of the voice recognizing apparatus and an intelligent computing device of present disclosure can be associated with artificial intelligence modules, drones (unmanned aerial vehicles (UAVs)), robots, augmented reality (AR) devices, virtual reality (VR) devices, devices related to 5G service, etc.

18 Claims, 14 Drawing Sheets

(51) Int. Cl.
*G10L 15/30* (2013.01)
*G10L 25/84* (2013.01)

(56) References Cited

U.S. PATENT DOCUMENTS

| | | | |
|---|---|---|---|
| 2014/0278389 A1* | 9/2014 | Zurek | G10L 15/20 |
| | | | 704/231 |
| 2016/0253995 A1* | 9/2016 | Zhou | H04R 3/00 |
| | | | 704/233 |
| 2019/0349964 A1* | 11/2019 | Liou | H04W 76/27 |
| 2019/0384569 A1* | 12/2019 | Kim | G06F 3/0482 |
| 2020/0075044 A1* | 3/2020 | Jankowski, Jr. | G10L 15/183 |
| 2020/0313802 A1* | 10/2020 | Xu | H04W 72/08 |

* cited by examiner

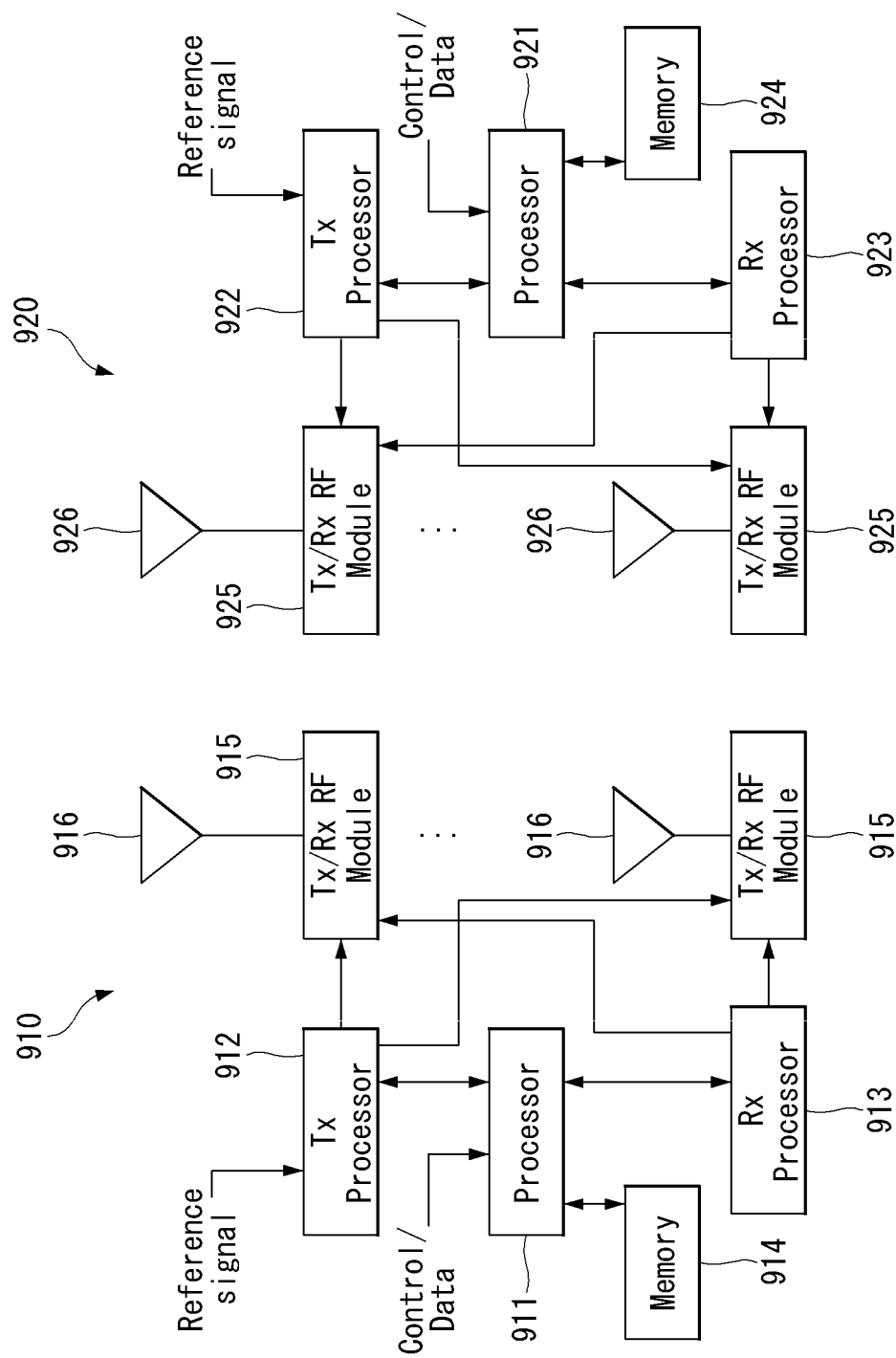
[FIG. 1]

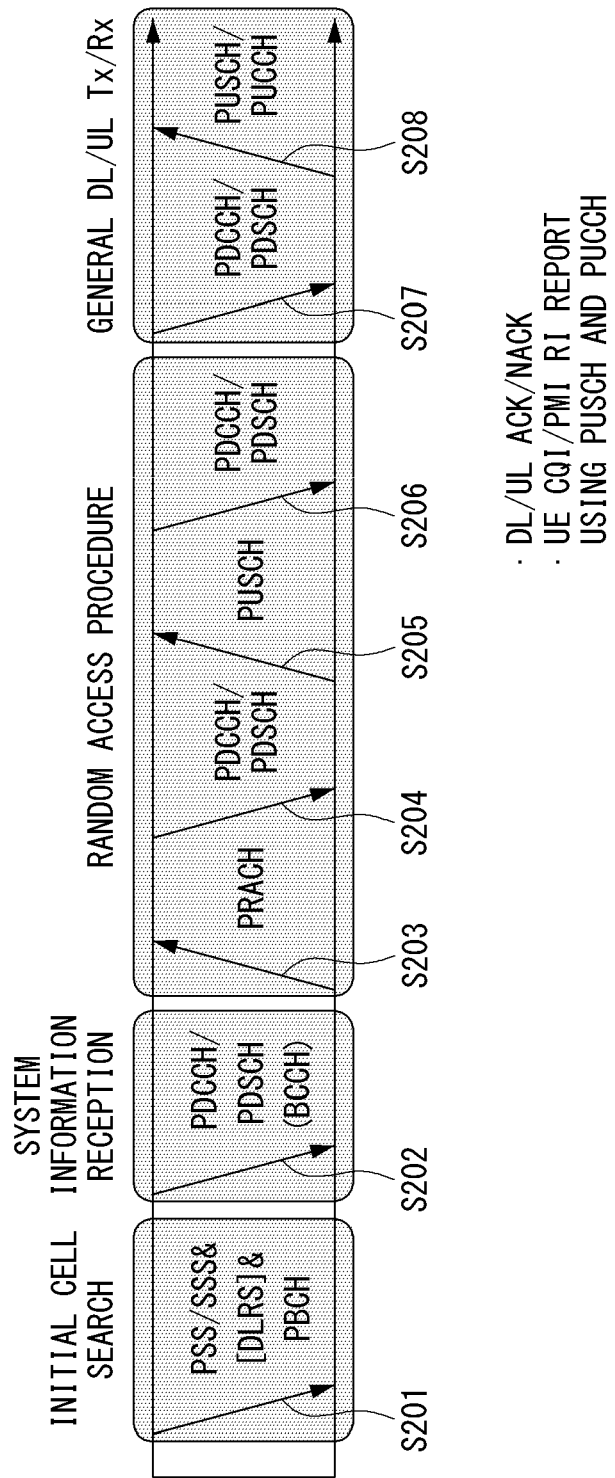
[FIG. 2]

[FIG. 3]
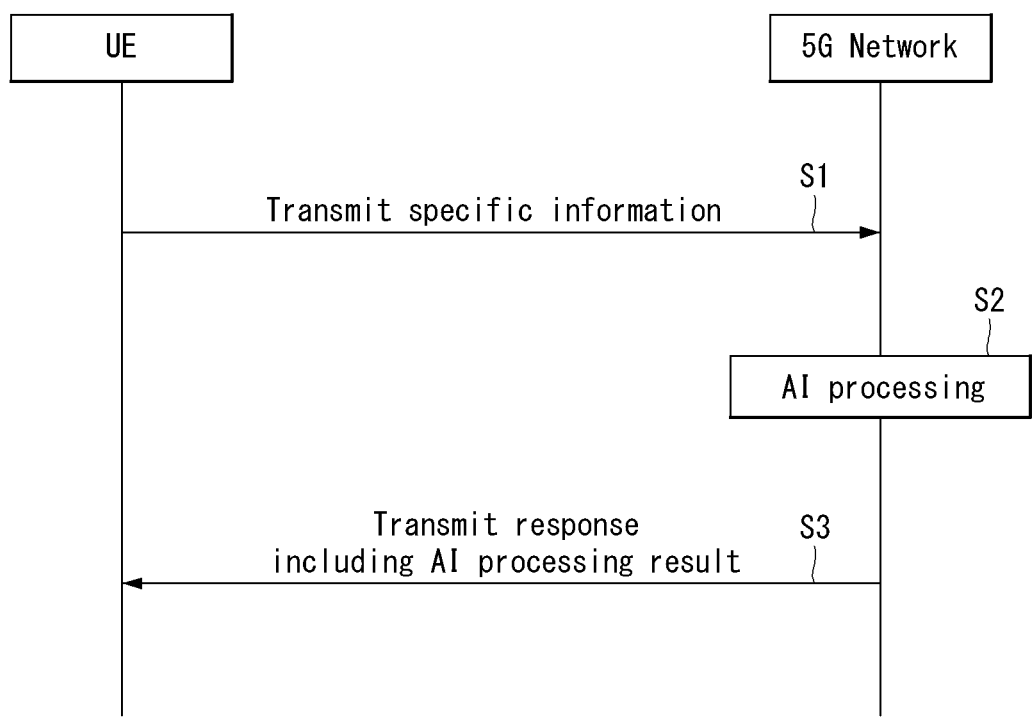

[FIG. 4]
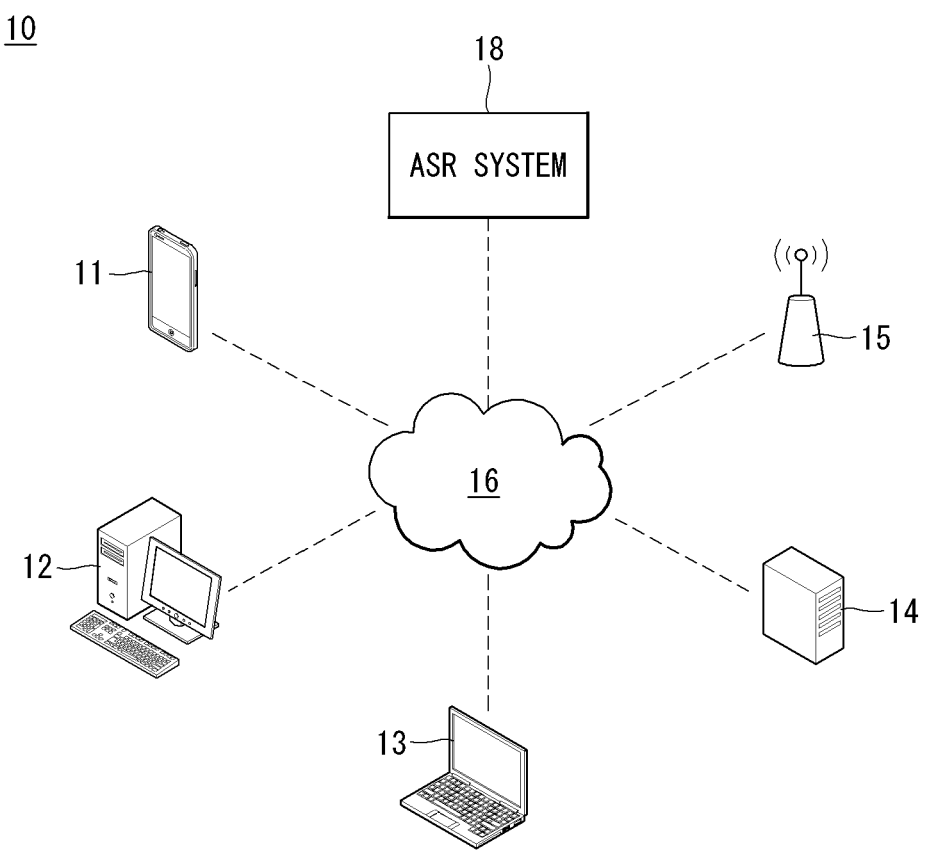

[FIG. 5]
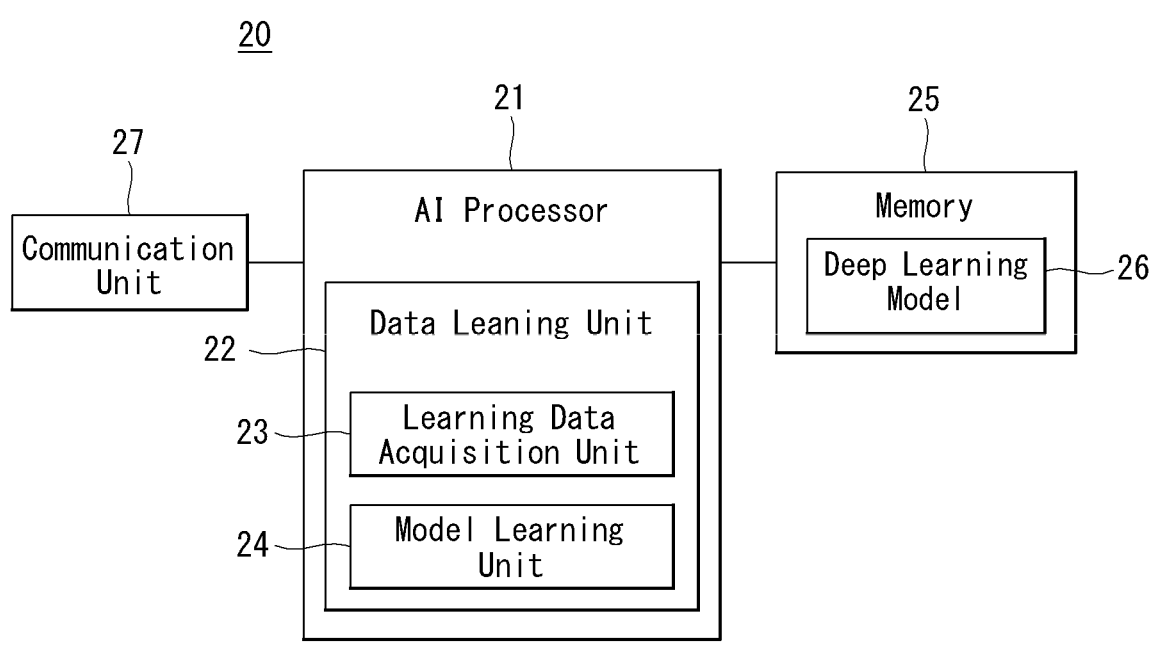

[FIG. 6]
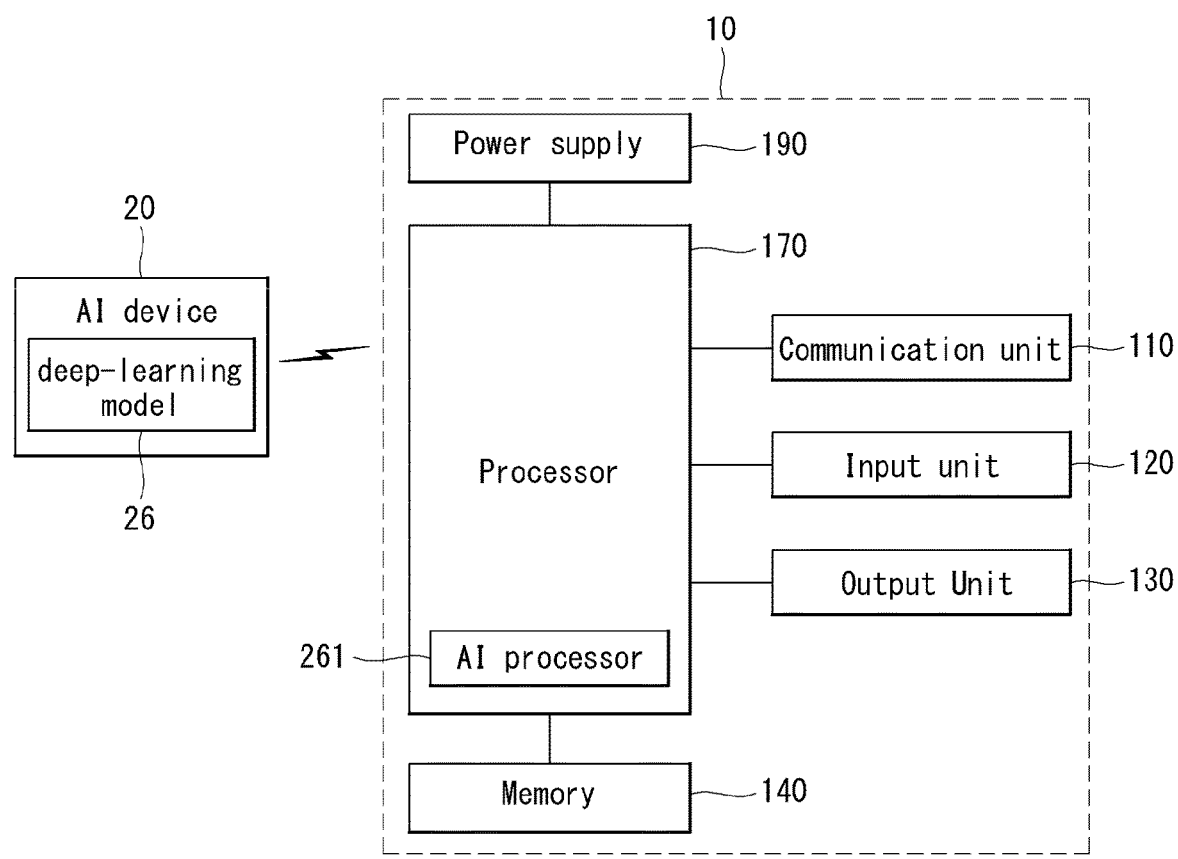

[FIG. 7]
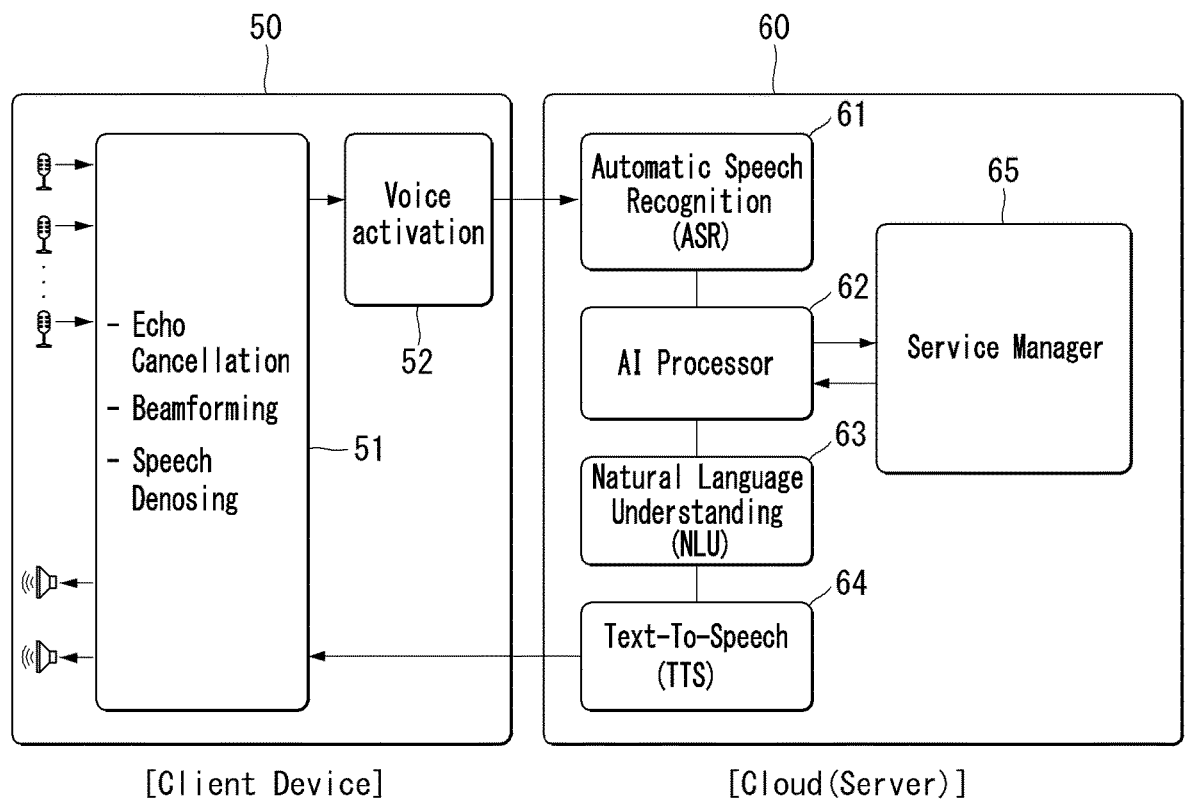

【FIG. 8】
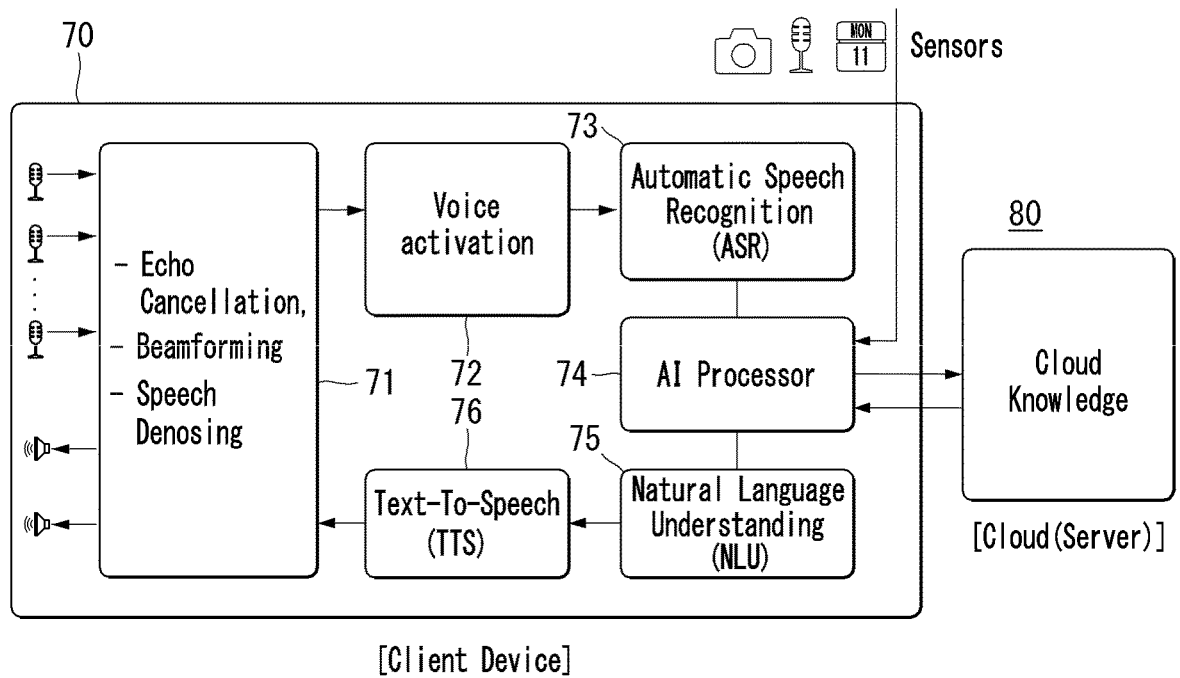

[FIG. 9]
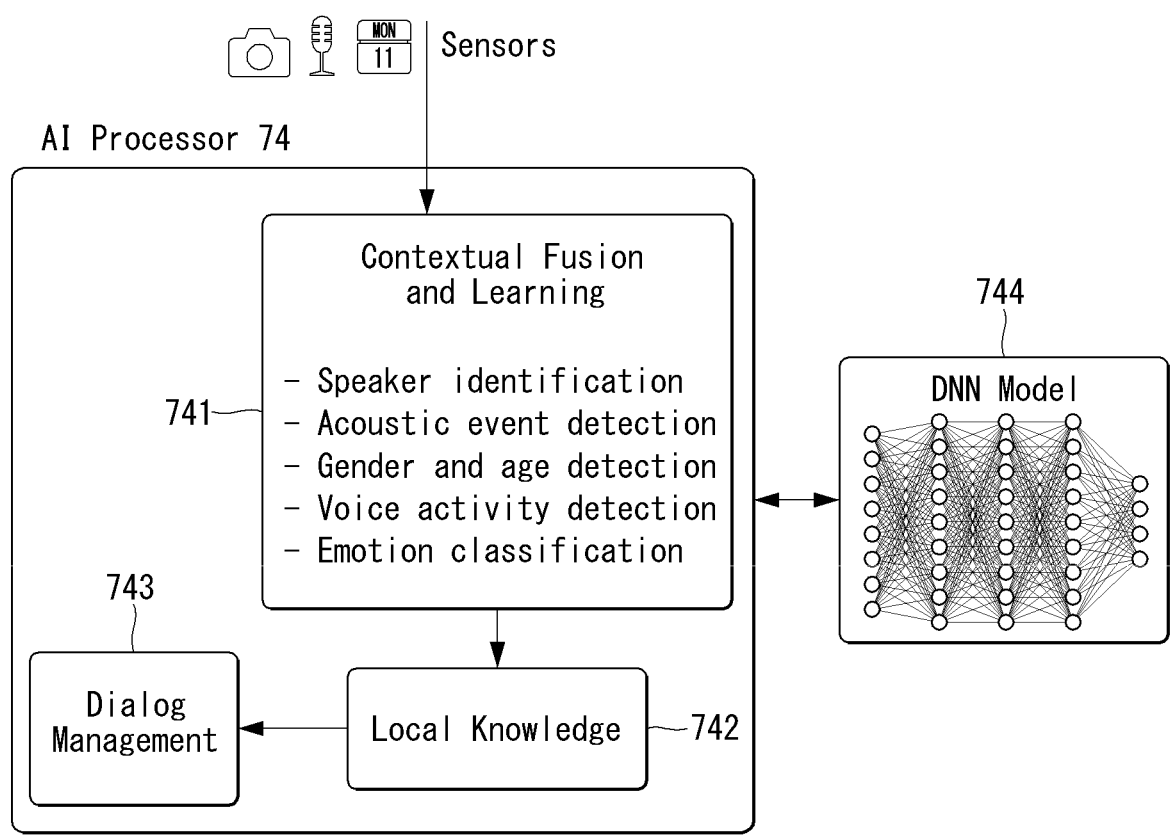

[FIG. 10]
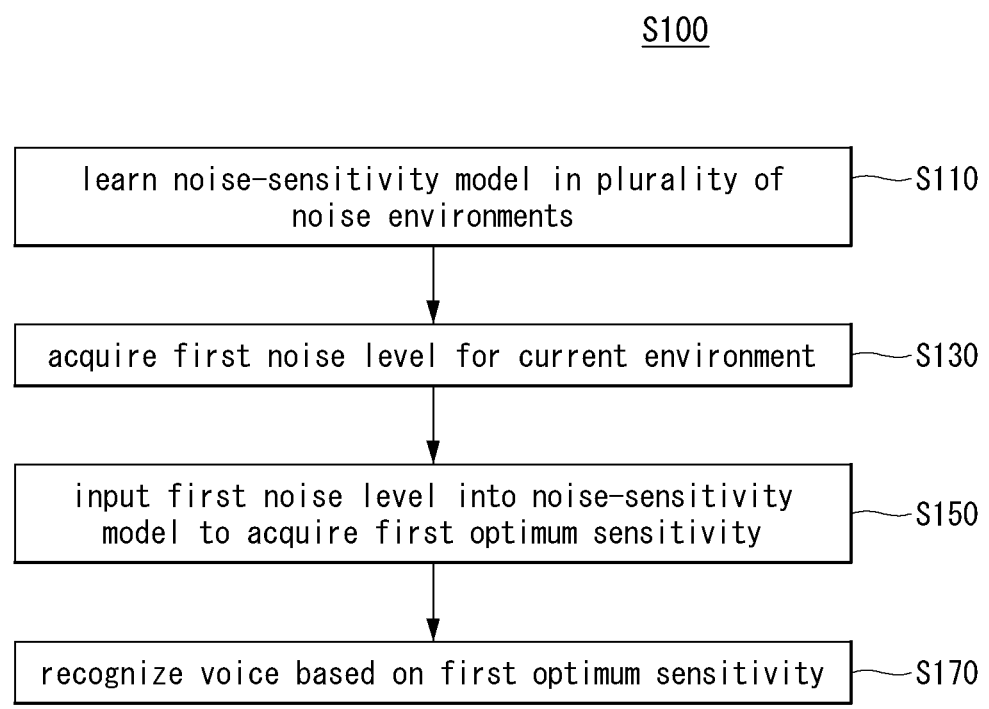

[FIG. 11]
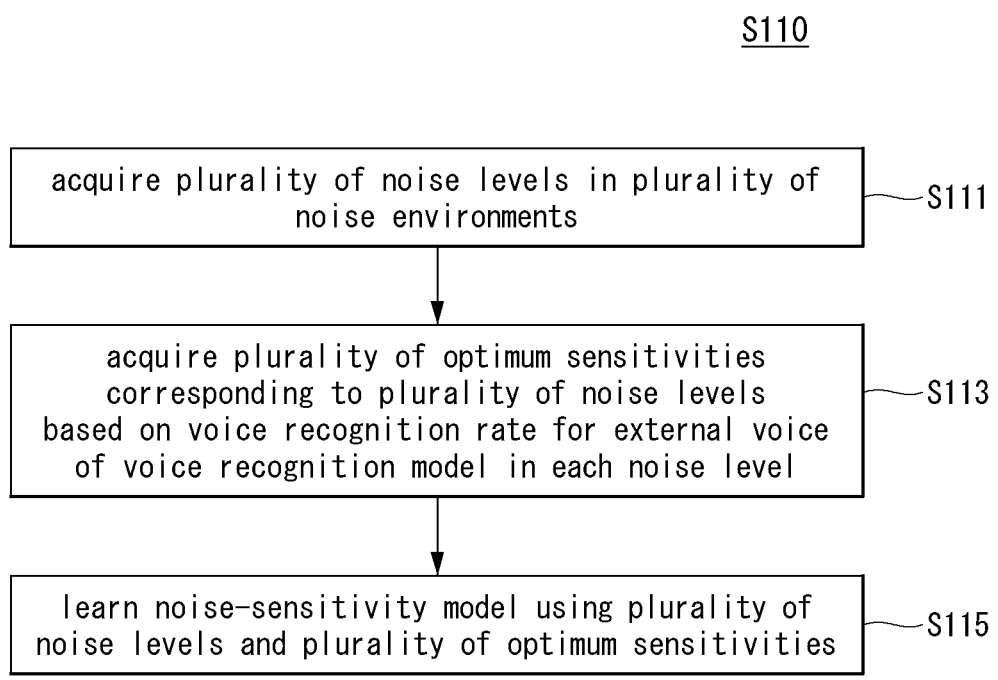

[FIG. 12]
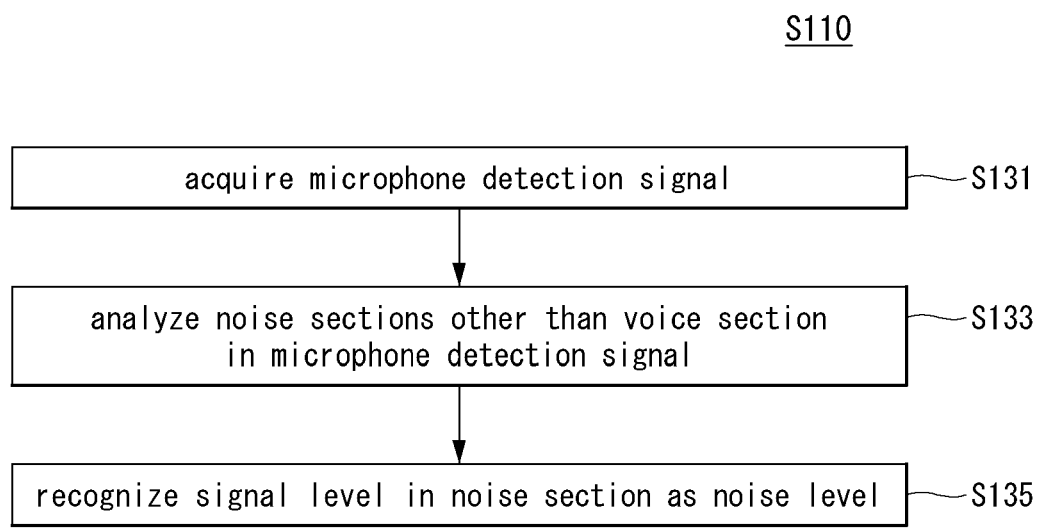

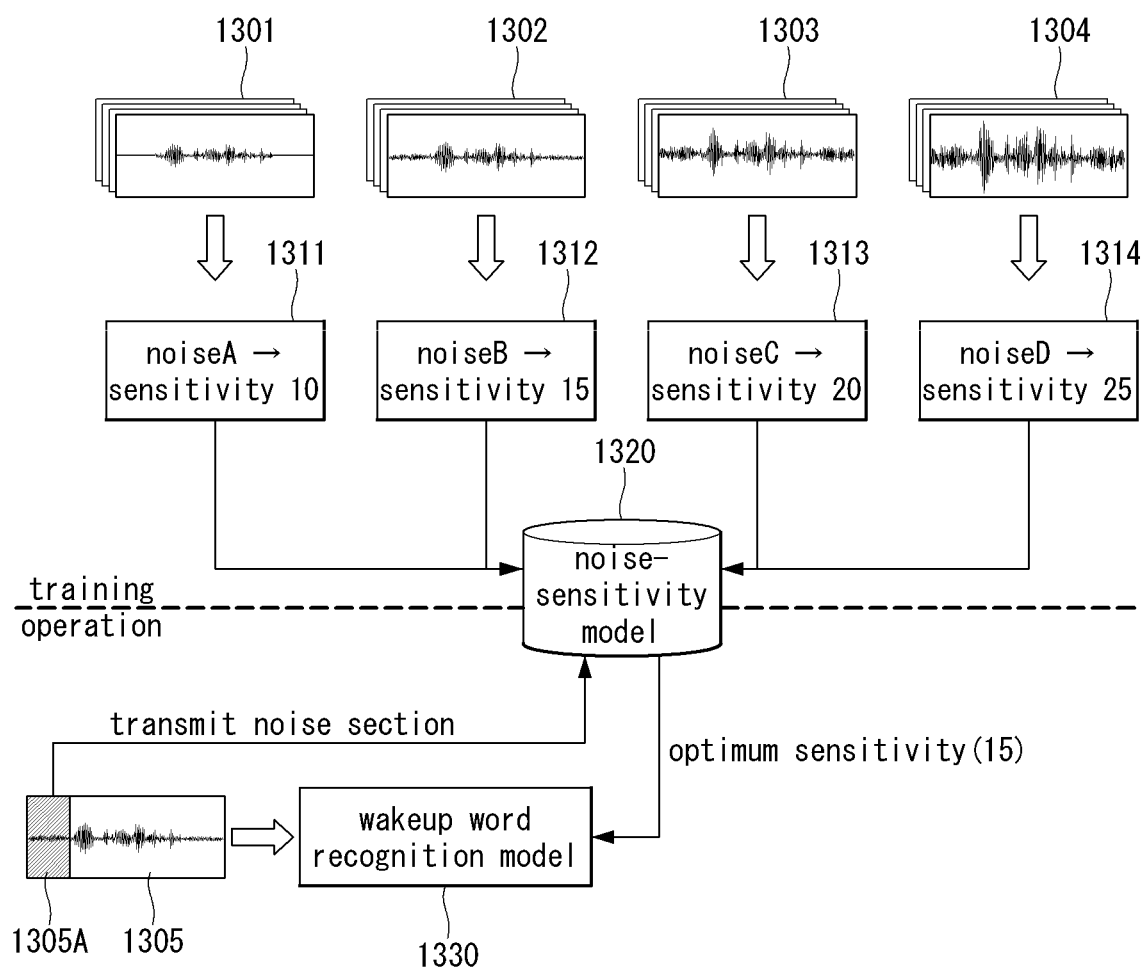
[FIG. 13]

[FIG. 14]
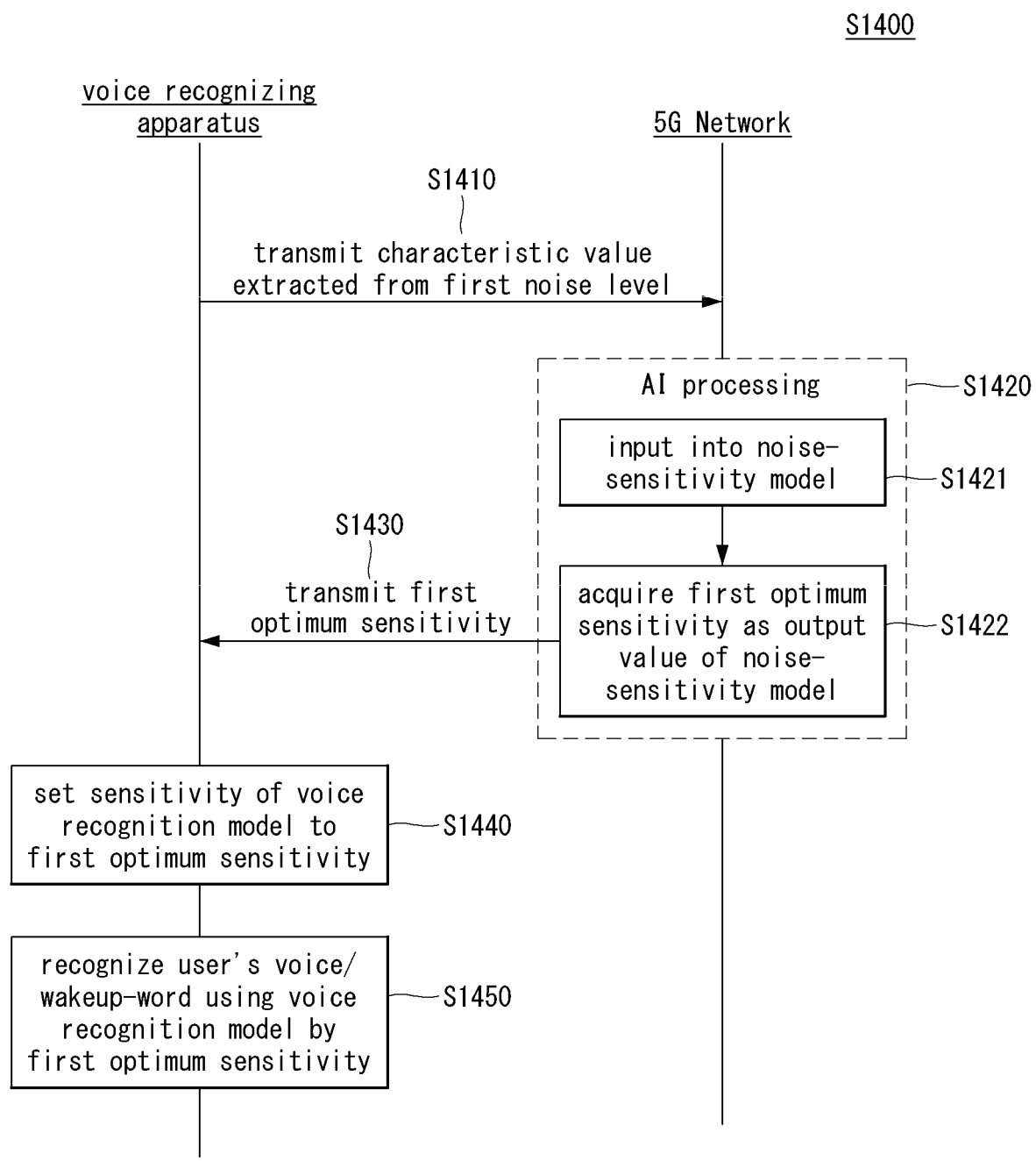

INTELLIGENT VOICE RECOGNIZING METHOD, APPARATUS, AND INTELLIGENT COMPUTING DEVICE

CROSS-REFERENCE TO RELATED APPLICATION(S)

This application is based on and claims priority under 35 U.S.C. 119 to Korean Patent Application No. 10-2019-0107795, filed on Aug. 30, 2019, in the Korean Intellectual Property Office, the disclosure of which is herein incorporated by reference in its entirety.

BACKGROUND OF THE INVENTION

Field of the Invention

Present disclosure relates to an intelligent voice recognizing method, an intelligent voice recognizing apparatus and an intelligent computing device and, more particularly, to an intelligent voice recognizing method, an intelligent voice recognizing apparatus and an intelligent computing device for actively recognizing voice in various noise environments.

Related Art

The voice recognition device is a device that converts a user's voice into text, analyzes the meaning of a message included in the text, and outputs another type of sound based on the analysis result.

Examples of the voice recognition device may be a home robot of a home IoT system or an artificial intelligence speaker equipped with artificial intelligence technology.

SUMMARY OF THE INVENTION

Present disclosure is to solve the necessities and/or problems described above.

Furthermore, present disclosure provides an intelligent voice recognizing method, an intelligent voice recognizing apparatus and an intelligent computing device for actively recognizing a user's voice in various noise environments around the voice recognizing apparatus.

In an aspect, a method for intelligently recognizing voice by a voice recognizing apparatus in various noise environments is provided. The method includes acquiring a first noise level for an environment in which the voice recognizing apparatus is located; inputting the first noise level into a previously learned noise-sensitivity model to acquire a first optimum sensitivity; and recognizing a user's voice based on the first optimum sensitivity, wherein the noise-sensitivity model is learned in a plurality of noise environments acquiring different noise levels.

The method may further include acquiring a plurality of noise-sensitivity data sets acquired from the plurality of noise environments, and learning the noise-sensitivity model using the plurality of noise-sensitivity data sets.

The acquiring of the plurality of noise-sensitivity data sets may include acquiring a plurality of noise levels in the plurality of noise environments; acquiring a plurality of voice recognition rates for external voice of the voice recognizing apparatus in each of the plurality of noise levels; acquiring a plurality of optimum sensitivities corresponding to the plurality of noise levels, respectively, based on the plurality of voice recognition rates; and configuring the plurality of noise-sensitivity data sets using the plurality of noise levels and the plurality of optimum sensitivities.

The acquiring of the first noise level may include acquiring a microphone detection signal through at least one microphone of the voice recognizing apparatus; determining a signal level at a noise section in the microphone detection signal; and acquiring the signal level at the noise section as the first noise level.

The noise section may include sections other than a voice section where the user's voice is detected in the microphone detection signal.

The method may further include receiving a Downlink Control Information (DCI) used to schedule transmission of the first noise level from a network; and transmitting the first noise level to the network based on the DCI.

The method may further include performing an initial access procedure with the network based on a synchronization signal block (SSB); and transmitting the first noise level through a PUSCH to the network, wherein the SSB and a DM-RS of the PUSCH may be quasi-co located for a QCL type D.

The method may further include controlling a communication unit of the voice recognizing apparatus to transmit the first noise level to an AI processor included in the network; and controlling the communication unit to receive information that is AI processed from the AI processor, wherein the AI processed information may include the first optimum sensitivity determined based on the first noise level.

In another aspect, a voice recognizing apparatus for intelligently recognizing voice in various noise environments is provided. The apparatus includes a communication unit; at least one microphone; and a processor acquiring a first noise level for an environment in which the voice recognizing apparatus is located using the at least one microphone, inputting the first noise level into a previously learned noise-sensitivity model to acquire a first optimum sensitivity, and recognizing a user's voice based on the first optimum sensitivity, wherein the noise-sensitivity model is learned in a plurality of noise environments acquiring different noise levels.

The processor may acquire a plurality of noise-sensitivity data sets acquired from the plurality of noise environments, and may learn the noise-sensitivity model using the plurality of noise-sensitivity data sets.

The processor may acquire a plurality of noise levels in the plurality of noise environments, acquire a plurality of voice recognition rates for external voice of the voice recognizing apparatus in each of the plurality of noise levels, acquire a plurality of optimum sensitivities corresponding to the plurality of noise levels, respectively, based on the plurality of voice recognition rates, and configure the plurality of noise-sensitivity data sets using the plurality of noise levels and the plurality of optimum sensitivities.

The processor may acquire a microphone detection signal through at least one microphone of the voice recognizing apparatus, determine a signal level at a noise section in the microphone detection signal, and acquire the signal level at the noise section as the first noise level.

The noise section may include sections other than a voice section where the user's voice is detected in the microphone detection signal.

The processor may receive a Downlink Control Information (DCI), used to schedule transmission of the first noise level acquired from an input unit provided in the voice recognizing apparatus through the communication unit, from a network, and may transmit the first noise level through the communication unit to the network based on the DCI.

The processor may perform an initial access procedure with the network based on a synchronization signal block (SSB) through the communication unit, and transmit the first noise level through a PUSCH to the network through the communication unit, and the SSB and a DM-RS of the PUSCH may be quasi-co located for a QCL type D.

The processor may control a communication unit to transmit the first noise level to an AI processor included in the network, and control the communication unit to receive information that is AI processed from the AI processor, and the AI processed information may include the first optimum sensitivity determined based on the first noise level.

In a further aspect, a non-transitory computer readable medium storing a computer executable component configured to execute in at least processor of a computing device is provided. The computer executable component may acquire a first noise level for an environment in which the voice recognizing apparatus is located using at least one microphone, input the first noise level into a previously learned noise-sensitivity model to acquire a first optimum sensitivity, and recognize a user's voice based on the first optimum sensitivity, wherein the noise-sensitivity model may be learned in a plurality of noise environments acquiring different noise levels.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the technical features of the disclosure. In the drawings:

FIG. 1 shows a block diagram of a wireless communication system to which methods proposed in the disclosure are applicable.

FIG. 2 shows an example of a signal transmission/reception method in a wireless communication system.

FIG. 3 shows an example of basic operations of an user equipment and a 5G network in a 5G communication system.

FIG. 4 shows an example of a block configuration diagram of a schematic system in which a voice recognizing method according to an embodiment of the present disclosure is implemented.

FIG. 5 is a block diagram of an AI device applicable to embodiments of present disclosure.

FIG. 6 is an exemplary block diagram of a voice recognizing apparatus according to an embodiment of present disclosure.

FIG. 7 shows a schematic block diagram of a speech synthesis apparatus in a speech synthesis system environment according to an embodiment of the present disclosure.

FIG. 8 shows a schematic block diagram of a speech synthesis apparatus in a speech synthesis system environment according to another embodiment of the present disclosure.

FIG. 9 shows a schematic block diagram of an intelligent processor that can implement start language recognition in accordance with an embodiment of the present disclosure.

FIG. 10 is a flowchart illustrating a voice recognizing method according to an embodiment of present disclosure.

FIG. 11 is a flowchart illustrating a process of learning a noise-sensitivity model in various noise environments according to an embodiment of present disclosure.

FIG. 12 is a flowchart illustrating a process of acquiring a noise level in a current noise environment according to an embodiment of present disclosure.

FIG. 13 illustrates an example in which the voice recognizing apparatus according to an embodiment of present disclosure constitutes a voice recognition model optimized for the current noise environment.

FIG. 14 is a flowchart illustrating an example of performing a process of FIG. 13 through a 5G network.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and obtain information such as a cell ID. In LTE and NR systems, the P-SCH and S-SCH are respectively called a primary synchronization signal (PSS) and a secondary synchronization signal (SSS). After initial cell search, the UE can obtain broadcast information in the cell by receiving a physical broadcast channel (PBCH) from the BS. Further, the UE can receive a downlink reference signal (DL RS) in the initial cell search step to check a downlink channel state. After initial cell search, the UE can obtain more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE obtains time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/obtained through an SSS of the cell, and information on the cell ID among 336 cell ID groups is provided/obtained through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can obtain UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, ... }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.
- When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Processing Using 5G Communication

FIG. 3 shows an example of basic operations of AI processing in a 5G communication system.

The UE transmits specific information to the 5G network (S1). The 5G network may perform 5G processing related to the specific information (S2). Here, the 5G processing may include AI processing. And the 5G network may transmit response including AI processing result to UE (S3).

G. Applied Operations Between UE and 5G Network in 5G Communication System

Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to obtain DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

FIG. 4 shows an example of a block configuration diagram of a schematic system in which a voice recognizing method according to an embodiment of the present disclosure is implemented.

Referring to FIG. 4, a system in which a voice recognizing method according to an embodiment of the present disclosure is implemented may include a voice recognizing apparatus 10, a network system 16, and a TTS (Text-To-Speech) system 18 that is a speech synthesis engine.

At least one voice recognizing apparatus 10 may include a mobile phone 11, a PC 12, a notebook computer 13, and other server devices 14. The PC 12 and the notebook computer 13 may be connected to at least one network system 16 through a wireless access point 15. According to an embodiment of the present disclosure, the voice recognizing apparatus 10 may include an audio book and a smart speaker.

Meanwhile, the TTS system 18 may be implemented in a server included in a network and may be implemented through on-device processing and embedded in the voice recognizing apparatus 10. An embodiment of the present disclosure is described on the assumption that the TTS system 18 is disposed and implemented in the voice recognizing apparatus 10.

FIG. 5 is a block diagram of an AI device applicable to embodiments of present disclosure.

The AI device 20 may include an electronic device including an AI module or a server including the AI module, which may perform AI processing. Furthermore, the AI device 20 may be included in at least some components of the voice recognizing apparatus 10 shown in FIG. 4 to perform at least some of the AI processing.

The AI processing may include all operations related to the voice recognition of the voice recognizing apparatus 10 shown in FIG. 5. For example, the AI processing may be a process that analyzes data acquired through an input unit of the voice recognizing apparatus 10 to recognize new data.

The AI device 20 may include an AI processor 21, a memory (25) and/or a communication unit 27.

The AI device 20 may be a computing device that may learn a neural network, and may be implemented as various electronic devices, such as a server, a desktop PC, a laptop PC, or a tablet PC.

The AI processor 21 may learn a neural network using a program stored in the memory 25.

Particularly, the AI processor 21 may learn the neural network to analyze data acquired through the input unit and then recognize new data. Here, the neural network for recognizing the data may be designed to simulate the structure of the human brain on a computer, and may include a plurality of network nodes having weights that simulate the neurons of the human neural network.

The plurality of network nodes may exchange data according to the connecting relationship to simulate the synaptic action of neurons in which the neurons exchange signals through synapses. Here, the neural network may include a deep learning model developed from the neural network model. While the plurality of network nodes is located at different layers in the deep learning model, the nodes may exchange data according to the convolution connecting relationship. Examples of the neural network model include various deep learning techniques, such as a deep neural network (DNN), a convolution deep neural network (CNN), a recurrent neural network (RNN, Recurrent Boltzmann Machine), a restricted Boltzmann machine (RBM), a deep belief network (DBN) or a deep Q-Network, and may be applied to fields such as computer vision, voice recognition, natural language processing, voice/signal processing or the like.

Meanwhile, the processor performing the above-described function may be a general-purpose processor (e.g. CPU), but may be an AI dedicated processor (e.g. GPU) for artificial intelligence learning.

The memory 25 may store various programs and data required to operate the AI device 20. The memory 25 may be implemented as a non-volatile memory, a volatile memory, a flash memory, a hard disk drive (HDD) or a solid state drive (SDD). The memory 25 may be accessed by the AI processor 21, and reading/writing/correcting/deleting/update of data by the AI processor 21 may be performed. Furthermore, the memory 25 may store the neural network model (e.g. the deep learning model 26) generated through a learning algorithm for classifying/recognizing data in accordance with the embodiment of present disclosure.

The AI processor 21 may include a data learning unit 22 which learns the neural network for data classification/recognition. The data learning unit 22 may learn a criterion about what learning data is used to determine the data classification/recognition and about how to classify and recognize data using the learning data. The data learning unit 22 may learn the deep learning model by acquiring the learning data that is used for learning and applying the acquired learning data to the deep learning model.

The data learning unit 22 may be made in the form of at least one hardware chip and may be mounted on the AI device 20. For example, the data learning unit 22 may be made in the form of a dedicated hardware chip for the artificial intelligence AI, and may be made as a portion of the general-purpose processor (CPU) or the graphic dedicated processor (GPU) to be mounted on the AI device 20. Furthermore, the data learning unit 22 may be implemented as a software module. When the data learning unit is implemented as the software module (or a program module including an instruction), the software module may be stored in a non-transitory computer readable medium. In this case, at least one software module may be provided by an operating system (OS) or an application.

The data learning unit 22 may include the learning-data acquisition unit 23 and the model learning unit 24.

The learning-data acquisition unit 23 may acquire the learning data needed for the neural network model for classifying and recognizing the data. For example, the learning-data acquisition unit 23 is learning data, and may acquire data that is to be input into the neural network model and/or a characteristic value extracted from the data.

The model learning unit 24 may learn to have a determination criterion about how the neural network model classifies predetermined data, using the acquired learning data. The model learning unit 24 may learn the neural network model through supervised learning using at least some of the learning data as the determination criterion. Alternatively, the model learning unit 24 may learn the neural network model through unsupervised learning that finds the determination criterion, by learning by itself using the learning data without supervision. Furthermore, the model learning unit 24 may learn the neural network model through reinforcement learning using feedback on whether the result of situation determination according to the learning is correct. Furthermore, the model learning unit 24 may learn the neural network model using the learning algorithm including error back-propagation or gradient descent.

If the neural network model is learned, the model learning unit 24 may store the learned neural network model in the memory. The model learning unit 24 may store the learned neural network model in the memory of the server connected to the AI device 20 with a wired or wireless network.

The data learning unit 22 may further include a learning-data front end (not shown) and a learning-data selection unit (not shown) to improve the analysis result of the recognition model or to save resources or time required for generating the recognition model.

The learning-data front end may preprocess the acquired data so that the acquired data may be used for the learning for acquiring new data. For example, the learning-data front end may process the acquired data in a preset format so that the model learning unit 24 may use the acquired learning data for the learning for recognizing new data.

Furthermore, the learning-data selection unit may select the data required for the learning among the learning data acquired by the learning-data acquisition unit 23 or the learning data preprocessed in the front end. The selected learning data may be provided to the model learning unit 24. For example, the learning-data selection unit may select only data on a syllable included in a specific region as the learning data, by detecting the specific region among the characteristic values of data acquired by the voice recognizing apparatus 10.

Furthermore, the data learning unit 22 may further include a model evaluation unit (not shown) to improve the analysis result of the neural network model.

When the evaluated data is input into the neural network model and the analysis result outputted from the evaluated data does not satisfy a predetermined criterion, the model evaluation unit may cause the model learning unit 22 to learn again. In this case, the evaluated data may be predefined data for evaluating the recognition model. By way of example, the model evaluation unit may evaluate that the predetermined criterion is not satisfied when the number or ratio of the evaluated data whose the analysis result is inaccurate among the analysis result of the learned recognition model for the evaluated data exceeds a preset threshold.

The communication unit 27 may transmit the AI processing result by the AI processor 21 to the external electronic equipment.

Here, when the AI processor 21 is included in the network system, the external electronic device may be the voice recognizing apparatus according to the embodiment of present disclosure.

Although the AI device 20 illustrated in FIG. 5 is functionally divided into the AI processor 21, the memory 25, the communication unit 27 and the like, it is to be noted that the above-described components may be integrated into one module, which is referred to as an AI module.

FIG. 6 is an exemplary block diagram of a voice recognizing apparatus according to an embodiment of present disclosure.

The embodiment of present disclosure may include computer readable and computer executable instructions that may be included in the voice recognizing apparatus 10. Although FIG. 6 shows a plurality of components included in the voice recognizing apparatus 10, components that are not shown may also be included in the voice recognizing apparatus 10.

A plurality of voice recognizing apparatuses may be applied to one voice recognizing apparatus. In such a multi-apparatus system, the voice recognizing apparatus may include different components to perform various aspects for voice recognition processing. The voice recognizing apparatus 10 shown in FIG. 6 is illustrative and may be an independent apparatus. This may be implemented as a larger apparatus or one component of the system.

The embodiment of present disclosure may be applied to a plurality of different apparatuses and computer systems, for example, a general-purpose computing system, a server-client computing system, a telephone computing system, a laptop computer, a handheld terminal, a PDA, and a tablet computer. The voice recognizing apparatus 10 may be applied as a component of another apparatus or system for providing a voice recognizing function, such as automated teller machines (ATMs), kiosks, global positioning systems (GPS), home appliances (e.g., refrigerators, ovens, washing machines, etc.), vehicles, electronic book readers (e-book readers), etc.

As illustrated in FIG. 6, the voice recognizing apparatus 10 may include a communication unit 110, an input unit 120, an output unit 130, a memory 140, a power supply unit 190 and/or a processor 170. Meanwhile, some components disclosed in the voice recognizing apparatus 10 may be shown several times in one apparatus, as a single component.

The voice recognizing apparatus 10 may include an address/data bus (not shown) to transmit data between the components of the voice recognizing apparatus 10. Respective components in the voice recognizing apparatus 10 may be directly connected to other components via the bus (not shown). Meanwhile, the respective components in the voice recognizing apparatus 10 may be directly connected to the processor 170.

The communication unit 110 may include a wireless communication device, such as radio frequency (RF), infrared, Bluetooth, a wireless local area network (WLAN) (Wi-Fi, etc.) or a wireless network wireless device, such as a 5G network, a LTE (Long Term Evolution) network, a WiMAN network, or a 3G network.

The input unit 120 may include a microphone, a touch input unit, a keyboard, a mouse, a stylus or other input units.

The output unit 130 may output information (e.g. voice) processed by the voice recognizing apparatus 10 or another apparatus. The output unit 130 may include a speaker, a headphone or another component suitable for propagating voice. As another example, the output unit 130 may include an audio output unit. Furthermore, the output unit 130 may include a visual or tactile display, an audio speaker, a headphone, a printer or other output units. The output unit 130 may be integrated into the voice recognizing apparatus 10 or may be separated from the voice recognizing apparatus 10.

The input unit 120 and/or the output unit 130 may also include an USB (Universal Serial Bus), a FireWire, a Thunderbolt or an interface for connecting an external peripheral device such as another connecting protocol. The input unit 120 and/or output unit 130 may include a network connection such as an Ethernet port or a modem. The voice recognizing apparatus 10 may be connected through the input unit 120 and/or the output unit 130 to Internet or distributed computing environment. Furthermore, the voice recognizing apparatus 10 may be connected through the input unit 120 or the output unit 130 to a removable or external memory (e.g. separable memory card, memory key drive, network storage, etc.).

The memory 140 may store data and instructions. The memory 140 may include a magnetic storage, an optical storage, a solid-state storage type, etc. The memory 140 may include a volatile RAM, a non-volatile ROM or another type of memory.

The voice recognizing apparatus 10 may include a processor 170. The processor 170 may be connected to the bus (not shown), the input unit 120, the output unit 130 and/or other components of the voice recognizing apparatus 10. The processor 170 may correspond to the CPU for processing data, a computer readable instruction for processing data, and the memory for storing data and instructions.

The computer instructions that are to be processed in the processor 170 for operating the voice recognizing apparatus 10 and various components may be executed by the processor 170, and may be stored in the memory 140, the external device or the memory or storage included in the processor 170 that will be described below. Alternatively, all or some of the executable instructions may be added to software to be accommodated in hardware or firmware. The embodiment of present disclosure may be implemented in various combinations of the software, the firmware and/or the hardware, for example.

To be more specific, the processor 170 may process text data into an audio waveform including voice, or may process the audio waveform into the text data. The source of the text data may be generated by internal components of the voice recognizing apparatus 10. Furthermore, the source of the text data may be received from the input unit such as a keyboard or transmitted to the voice recognizing apparatus 10 through the network connection. The text may be in the form of sentences that include texts, numbers and/or punctuations to be converted into speech by the processor 170. Input text may also include special annotation for processing by the processor 170, and may indicate how the specific text should be pronounced through the special annotation. The text data may be processed in real time or may be stored or processed later.

Further, although not shown in FIG. 6, the processor 170 may include a front end, a speech synthesis engine and a TTS storage unit. The front end may convert input test data into symbolic linguistic representation for processing by the speech synthesis engine. The speech synthesis engine may compare annotated phonetic unit models with information stored in a TTS storage unit to convert the input text into the speech. The front end and the speech synthesis engine may include an embedded internal processor or memory, or use the processor 170 and the memory 140 included in the voice recognizing apparatus 10. Instructions for operating the front end and the speech synthesis engine may be included in the processor 170, the memory 140 of the voice recognizing apparatus 10 or the external device.

The text input into the processor 170 may be transmitted to the front end for processing. The front end may include a module for performing text normalization, linguistic analysis, and linguistic prosody generation.

While the text normalization operation is performed, the front end processes the text input and generates a standard text to convert numbers, abbreviations, and symbols as they are written.

While the linguistic analysis operation is performed, the front end may analyze the language of the normalized text to generate a series of phonetic units corresponding to the input text. Such a process may be referred to as phonetic transcription.

The phonetic units are finally combined to include the symbolic representation of the sound units outputted by the voice recognizing apparatus 10 as the speech. Various sound units can be used to segment text for speech synthesis.

The processor 170 may process voice based on phonemes (individual sound), half-phonemes, di-phones (last half of one phoneme combined with first half of an adjacent phoneme), bi-phones (two continuous phonemes), syllables, words, phrases, sentences, or other units. Each word may be mapped in one or more phonetic units. Such a mapping may be performed using a language dictionary stored in the voice recognizing apparatus 10.

The linguistic analysis performed by the front end may also include the process of confirming different grammatical elements, such as prefixes, suffixes, phrases, punctuation, or syntactic boundaries. The grammatical components may be used to output a natural audio waveform by the processor 170. The language dictionary may also include letter-to-sound rules and other tools that may be used to pronounce previously unconfirmed combination of words or letters that may be generated by the processor 170. Generally, as information contained in the language dictionary increases, a high quality of speech output can be guaranteed.

Based on the linguistic analysis, the front end may perform linguistic prosody generation annotated with prosodic characteristics indicating how the final acoustic unit in the phonetic units should be pronounced in the final output speech.

The prosodic characteristics may also be referred to as acoustic features. While the operation of this step is performed, the front end may be integrated into the processor 170 considering any prosodic annotations accompanying the text input. The acoustic features may include a pitch, energy, duration, etc. The application of the acoustic features may be based on the prosodic model that may be used by the processor 170.

Such a prosodic model indicates how the phonetic units should be pronounced in certain situations. For example, the prosodic model may consider a phoneme's position in a syllable, a syllable's position in a word, a word's position in a sentence or phrase, neighboring phonetic units, etc. Similarly to the language dictionary, as information of the prosodic model increases, a high quality of speech output can be guaranteed.

The output of the front end may include a series of phonetic units annotated with the prosodic characteristics. The output of the front end may be referred to as symbolic linguistic representation. The symbolic linguistic representation may be transmitted to the speech synthesis engine.

The speech synthesis engine may perform a process of converting speech into the audio waveform to output it through the output unit 130 to a user. The speech synthesis engine may be configured to convert input text into a high quality of natural voice in an efficient manner. Such a high quality of speech may be configured to be pronounced similarly to a human speaker.

The speech synthesis engine may perform the speech synthesis using at least one different method.

A unit selection engine compares a recorded speech database with symbolic linguistic representation generated by the front end. The unit selection engine matches the symbol linguistic representation with the speech audio unit of the speech database. The matching unit is selected to form speech output. Selected matching units may be connected to each other. Each unit may include an audio waveform corresponding to the phonetic unit such as a short .wav file of specific sound, together with the description of various sound characteristics related to a .wav file (pitch, energy, etc.), and other pieces of information such as a position in a word, a sentence, a phrase, or a neighboring phonetic unit where the phonetic unit is indicated.

The unit selection engine may match input text using all information in the unit database to generate a natural waveform. The unit database may include a plurality of phonetic units that provide different options to the voice recognizing apparatus 10 to connect the units to the speech. One of the advantages of the unit selection is to generate the natural speech output according to the size of the database. Furthermore, as the size of the unit database increases, the voice recognizing apparatus 10 may create the natural voice.

Meanwhile, the speech synthesis includes a parameter synthesis method as well as the above-described unit selection synthesis. In the parameter synthesis, synthesis parameters such as frequency, volume or noise may be transformed to generate the artificial voice waveform by a parameter synthesis engine, a digital signal processor, or another audio generator.

The parameter synthesis may match symbolic linguistic representation with a desired output speech parameter using an acoustic model and various statistical techniques. The parameter synthesis may not only process speech without a massive database related to the unit selection, but may also process the speech accurately at a high processing speed. The unit selection synthesis method and the parameter synthesis method may be performed individually or in combination to output speech audio.

The parameter speech synthesis may be performed as follows. The processor 170 may include an acoustic model that may convert the symbolic linguistic representation into the synthesis acoustic waveform of the text input in response to an audio signal operation. The acoustic model may include rules that may be used by the parameter synthesis engine to allocate the specific audio waveform parameters to the input phonetic unit and/or prosodic annotations. The rules may be used to calculate a score indicating a possibility that a specific audio output parameter (frequency, volume, etc.) corresponds to a portion of the input symbolic linguistic representation from the front end.

The parameter synthesis engine may apply a plurality of technologies to match voice to be synthesized with the input phonetic unit and/or prosodic annotation. One of the general technologies uses a Hidden Markov Model (HMM). The HMM may be used to determine a probability that the audio output should match with the text input. The HMM may be used to convert parameters of a linguistic and acoustic space into parameters that are to be used by a vocoder (digital voice encoder), so as to artificially synthesize a desired speech.

Furthermore, the voice recognizing apparatus 10 may include the phonetic unit database to be used for the unit selection. The phonetic unit database may be stored in the memory 140 or another storage configuration. The phonetic unit database may include recorded speech vocalization. The speech vocalization may be a text corresponding to uttered contents. Furthermore, the phonetic unit database may include recorded voice (audio waveform, feature vector or different format form) occupying a considerable storage space in the voice recognizing apparatus 10. Unit samples of the phonetic unit database may be classified in various methods including the phonetic unit (phonemes, di-phones, words, etc.), a linguistic prosodic label, an acoustic features sequence, a human speaker identity, etc. The sample utterance may be used to generate a mathematical model corresponding to desired audio output for the specific phonetic unit.

When the speech synthesis engine matches symbolized linguistic representation, it is possible to select a unit in the phonetic unit database which is most closely matched with the input text (including both the phonetic unit and the prosodic symbol annotation). Generally, the larger the phonetic unit database is, the more the number of selectable unit samples is, thus enabling accurate speech output.

The processor 170 may transmit the audio waveforms including the speech output to the output unit 130 to output it to a user. The processor 170 may store the audio waveforms including the speech in the memory 140 in a plurality of different formats such as a series of feature vectors, uncompressed audio data or compressed audio data. For example, the processor 170 can encode and/or compress the speech output using an encoder/decoder before it being transmitted. The encoder/decoder can encode and decode the audio data such as digitized audio data or feature vector. Furthermore, the function of the encoder/decoder may be located in a separate component or performed by the processor 170.

Meanwhile, the memory 140 may store other pieces of information for the speech recognition. The contents of the memory 140 may be prepared for general voice recognition and TTS use, and may be customized to include sound and words that are likely to be used in a specific application. For example, the TTS storage may include customized voice that is specific for location and navigation to process TTS by a GPS device.

Furthermore, the memory 140 may be customized for a user based on a personalized desired speech output. For example, the user may prefer a specific sex, a specific accent, a specific speed, a specific emotion (e.g. happy voice) as output voice. The speech synthesis engine may include a specialized database or model to describe a user preference.

The voice recognizing apparatus 10 may also be configured to perform the TTS processing in multiple languages. For each language, the processor 170 may include data, instructions and/or components that are specifically configured to synthesize voice in a desired language.

In order to improve performance, the processor 170 may modify or update the contents of the memory 140 based on the feedback on the TTS processing result, the processor 170 may enhance voice recognition beyond capabilities provided by a training corpus.

As the processing capability of the voice recognizing apparatus 10 is improved, the speech output reflecting the emotional attribute of the input text is possible. Alternatively, although the emotional attribute is not included in the input text, the voice recognizing apparatus 10 may output the speech reflecting the intention (emotional information) of a user who writes the input text.

Indeed, when building a model that is to be integrated into a TTS module for performing the TTS processing, the TTS system may integrate the above-mentioned components with other components. For instance, the voice recognizing apparatus 10 may include a block for setting the human speaker.

A human-speaker setting unit may set a human speaker for each character appearing in a script. The human-speaker setting unit may be incorporated into the processor 170, or may be incorporated as a part of the front end or the speech synthesis engine. The human-speaker setting unit is configured to synthesize text corresponding to a plurality of characters using metadata corresponding to the profile of the human speaker into a set speaker's voice.

According to the embodiment of present disclosure, the metadata may use a Markup Language, preferably SSML (Speech Synthesis Markup Language).

Hereinafter, a speech processing procedure performed by a device environment and/or a cloud environment or server environment will be described with reference to FIGS. 7 and 8. FIG. 7 shows an example in which, while a speech can be received in a device 50, a procedure of processing the received speech and thereby synthesize the speech, that is, overall operations of speech synthesis, is performed in a cloud environment 60. On the contrary, FIG. 8 shows an example of on-device processing indicating that a device 70 performs the aforementioned overall operations of speech synthesis by processing a received speech and thereby synthesizing the speech.

In FIGS. 7 and 8, the device environments 70 may be referred to as client devices, and the cloud environments 60 and 80 may be referred to as servers.

FIG. 7 shows a schematic block diagram of a text-to-speech (TTS) device in a TTS system according to an embodiment of the present disclosure.

In order to process a speech event in an end-to-end speech UI environment, various configurations are required. A sequence for processing the speech event performs signal acquisition playback, speech pre-processing, voice activation, voice recognition, natural language processing, and speech synthesis by which a device responds to a user.

The client device 50 may include an input module. The input module may receive a user input from a user. For example, the input module may receive the user input from an external device (e.g., a keyboard and a headset) connected thereto. In addition, for example, the input module may include a touch screen. In addition, for example, the input module may include a hardware key located in a user terminal.

According to an embodiment, the input module may include at least one microphone capable of receiving a user's utterance as a speech signal. The input module may include a speech input system and receive a user's speech as a speech signal through the speech input system. By generating an input signal for an audio input, the at least one microphone may determine a digital input signal for a user's speech. According to an embodiment, multiple microphones may be implemented as an array. The array may be arranged in a geometric pattern, for example, a linear geometric shape, a circular geometric shape, or a different random shape. For example, the array may be in a pattern in which four sensors are placed at 90 degrees to receive sound from four directions. In some embodiments, the microphone may include sensors of different arrays in a space of data communication, and may include a networked array of the sensors. The microphone may include an omnidirectional microphone and a directional microphone (e.g., a shotgun microphone).

The client device 50 may include a pre-processing module 51 capable of pre-processing a user input (speech signal) that is received through the input module (e.g., a microphone).

The pre-processing module 51 may include an adaptive echo canceller (AEC) function to thereby remove echo included in a user speech signal received through the microphone. The pre-processing module 51 may include a noise suppression (NS) function to thereby remove background noise included in a user input. The pre-processing module 51 may include an end-point detect (EPD) function to thereby detect an end point of a user speech and thus find out where the user speech exists. In addition, the pre-processing module 51 may include an automatic gain control (AGC) function to thereby control volume of the user speech in such a way suitable for recognizing and processing the user speech.

The client device 50 may include a voice activation module 52. The voice activation module 52 may recognize a wake-up call indicative of recognition of a user's call. The voice activation module 52 may detect a predetermined keyword (e.g., Hi LG) from a user input which has been pre-processed. The voice activation module 52 may remain in a standby state to perform an always-on keyword detection function.

The client device 50 may transmit a user voice input to a cloud server. ASR and natural language understanding (NLU) operations, which are essential to process a user speech, is generally performed in Cloud due to computing, storage, power limitations, and the like. The Cloud may include the cloud device 60 that processes a user input transmitted from a client. The cloud device 60 may exists as a server.

The cloud device 60 may include an auto voice recognition (ASR) module 61, an artificial intelligent agent 62, a natural language understanding (NLU) module 63, a text-to-speech (TTS) module 64, and a service manager 65.

The ASR module 61 may convert a user input, received from the client device 50, into textual data.

The ASR module 61 includes a front-end speech pre-processor. The front-end speech pre-processor extracts a representative feature from a speech input. For example, the front- perform a Fourier transform on the speech input to extract spectral features that characterize the speech input as a sequence of representative multi-dimensional vectors. In addition, The ASR module 61 may include one or more voice recognition modules (e.g., an acoustic model and/or a language module) and may realize one or more voice recognition engines. Examples of the voice recognition model include Hidden Markov Models, Gaussian-Mixture Models, Deep Neural Network Models, n-gram language models, and other statistical models. Examples of the voice recognition model include a dynamic time warping (DTW)-based engine and a weighted finite state transducer (WFST)-based engine. The one or more voice recognition models and the one or more voice recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens).

Once the ASR module 61 generates a recognition result including a text string (e.g., words, or sequence of words, or sequence of tokens), the recognition result is transmitted to the NLP module 732 for intention deduction. In some examples, The ASR module 730 generates multiple candidate text expressions for a speech input. Each candidate text expression is a sequence of works or tokens corresponding to the speech input.

The NLU module 63 may perform a syntactic analysis or a semantic analysis to determine intent of a user. The syntactic analysis may be used to divide a user input into syntactic units (e.g., words, phrases, morphemes, or the like) and determine whether each divided unit has any syntactic element. The semantic analysis may be performed using semantic matching, rule matching, formula matching, or the like. Thus, the NLU module 63 may obtain a domain, intent, or a parameter (or a slot) necessary to express the intent from a user input through the above-mentioned analysis.

According to an embodiment, the NLU module 63 may determine the intent of the user and a parameter using a matching rule which is divided into a domain, intent, and a parameter. For example, one domain (e.g., an alarm) may include a plurality of intents (e.g., alarm setting, alarm release, and the like), and one intent may need a plurality of parameters (e.g., a time, the number of iterations, an alarm sound, and the like). The plurality of rules may include, for example, one or more mandatory parameters. The matching rule may be stored in a natural language understanding database.

According to an embodiment, the NLU module 63 may determine a meaning of a word extracted from a user input using a linguistic feature (e.g., a syntactic element) such as a morpheme or a phrase and may match the determined meaning of the word to the domain and intent to determine the intent of the user. For example, the NLU module 63 may determine the intent of the user by calculating how many words extracted from a user input are included in each of the domain and the intent. According to an embodiment, the NLU module 63 may determine a parameter of the user input using a word which is the basis for determining the intent. According to an embodiment, the NLU module 63 may determine the intent of the user using a NLU DB which stores the linguistic feature for determining the intent of the user input. According to another embodiment, the NLU module 63 may determine the intent of the user using a personal language model (PLM). For example, the NLU module 63 may determine the intent of the user using personalized information (e.g., a contact list, a music list, schedule information, social network information, etc.). For example, the PLM may be stored in, for example, the NLU DB. According to an embodiment, the ASR module 61 as well as the NLU module 63 may recognize a voice of the user with reference to the PLM stored in the NLU DB.

According to an embodiment, the NLU module 63 may further include a natural language generating module (not shown). The natural language generating module may change specified information to a text form. The information changed to the text form may be a natural language speech. For example, the specified information may be information about an additional input, information for guiding the completion of an action corresponding to the user input, or information for guiding the additional input of the user. The information changed to the text form may be displayed in a display after being transmitted to the client device or may be changed to a voice form after being transmitted to the TTS module.

The TTS module 64 may convert text input to voice output. The TTS module 64 may receive text input from the NLU module 63 of the LNU module 63, may change the text input to information in a voice form, and may transmit the information in the voice form to the client device 50. The client device 50 may output the information in the voice form via the speaker.

The speech synthesis module 64 synthesizes speech outputs based on a provided text. For example, a result generated by the ASR module 61 may be in the form of a text string. The speech synthesis module 64 may convert the text string to an audible speech output. The speech synthesis module 64 may use any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis.

In some examples, the speech synthesis module 64 may be configured to synthesize individual words based on phonemic strings corresponding to the words. For example, a phonemic string can be associated with a word in a generated text string. The phonemic string can be stored in metadata associated with the word. The speech synthesis model 64 may be configured to directly process the phonemic string in the metadata to synthesize the word in speech form.

Since the cloud environment generally has more processing capabilities or resources than the client device, a higher quality speech output may be obtained in synthesis on the client side. However, the present disclosure is not limited thereto, and the speech synthesis process may be performed on the client side (see FIG. 8).

Meanwhile, according to an embodiment, the client environment may further include an Artificial Intelligence (AI) agent 62. The AI processor 62 is defined to perform at least some of the above-described functions performed by the ASR module 61, the NLU module 62 and/or the TTS module 64. In addition, the AI module 62 may make contribution so that the ASR module 61, the NLU module 62 and/or the TTS module 64 perform independent functions, respectively.

The AI processor module 62 may perform the above-described functions through deep learning. The deep learning represents a certain data in a form readable by a computer (e.g., when the data is an image, pixel information is represented as column vectors or the like), and efforts are being made to conduct enormous researches for applying the representation to learning (which is about how to create better representation techniques and how to create a model that learns the better representation techniques), and, as a result, various deep learning techniques such as deep neural networks (DNN), convolutional deep neural networks (CNN), Recurrent Boltzmann Machine (RNN), Restricted Boltzmann Machine (RBM), deep belief networks (DBN), and Deep Q-Network, may be applied to computer vision, voice recognition, natural language processing, speech/signal processing, and the like.

Currently, all commercial voice recognition systems (Microsoft's Cortana, Skype translator, Google Now, Apple Siri, etc.) are based on deep learning techniques.

In particular, the AI processor module 62 may perform various natural language processes, including machine translation, emotion analysis, and information retrieval, to process natural language by use of a deep artificial neural network architecture.

Meanwhile, the cloud environment may include a service manager 65 capable of collecting various personalized information and supporting a function of the AI processor 62. The personalized information obtained through the service manager may include at least one data (a calendar application, a messaging service, usage of a music application, etc.) used through the cloud environment, at least one sensing data (a camera, a microphone, temperature, humidity, a gyro sensor, C-V2X, a pulse, ambient light, Iris scan, etc.) collected by the client device 50 and/or the cloud 60, off device data directly not related to the client device 50. For example, the personalized information may include maps, SMS, news, music, stock, weather, Wikipedia information.

For convenience of explanation, the AI processor 62 is represented as an additional block to be distinguishable from the ASR module 61, the NLU module 63, and the TTS module 64, but the AI processor 62 may perform at least some or all of the functions of the respective modules 61, 62, and 64.

In FIG. 7, an example in which the AI processor 62 is implemented in the cloud environment due to computing calculation, storage, power limitations, and the like, but the present disclosure is not limited thereto.

For example, FIG. 8 is identical to what is shown in FIG. 7, except for a case where the AI processor is included in the cloud device.

FIG. 8 is a schematic block diagram of a TTS device in a TTS system environment according to an embodiment of the present disclosure. A client device 70 and a cloud environment 80 shown in FIG. 8 may correspond to the client device 50 and the cloud device 60 aforementioned in FIG. 7, except for some configurations and functions. Accordingly, description about specific functions of corresponding blocks may refer to FIG. 7.

Referring to FIG. 8, the client device 70 may include a pre-processing module 51, a voice activation module 72, an ASR module 73, an AI processor 74, an NLU module 75, and a TTS module 76. In addition, the client device 50 may include an input module (at least one microphone) and at least one output module.

In addition, the cloud environment may include cloud knowledge 80 that stores personalized information in a knowledge form.

A function of each module shown in FIG. 8 may refer to FIG. 7. However, since the ASR module 73, the NLU module 75, and the TTS module 76 are included in the client device 70, communication with Cloud may not be necessary for a speech processing procedure such as voice recognition, speech synthesis, and the like, and thus, an instant real-time speech processing operation is possible.

Each module shown in FIGS. 7 and 8 are merely an example for explaining a speech processing procedure, and modules more or less than in FIGS. 7 and 8 may be included. In addition, two or more modules may be combined or different modules or modules with different arrangement structures may be included. The various modules shown in FIGS. 7 and 8 may be implemented in hardware, software instructions for execution by one or more processors, firmware, including one or more signal processing and/or application specific integrated circuits, or a combination thereof.

FIG. 9 is a schematic block diagram of an AI processor capable of performing emotion classification information-based TTS according to an embodiment of the present disclosure.

Referring to FIG. 9, in the speech processing procedure described with reference to FIGS. 7 and 8, the AI processor 74 may support an interactive operation with a user, in addition to an ASR operation, an NLU operation, and a TTS operation. Alternatively, using context information, the AI processor 74 may make contribution so that the NLU module 63 further clarify, complements, or additionally define information included in text expressions received from the ASR module 61.

Here, the context information may include preference of a user of a client device, hardware and/or software states of the client device, various types of sensor information received before, during, or after a user input, previous interactions (e.g., dialogue) between the AI processor and the user, etc. In the present disclosure, the context information is dynamic and varies depending on time, location, contents of the dialogue, and other elements.

The AI processor 74 may further include a context fusion and learning module 91, a local knowledge 92, and a dialogue management 93.

The context fusion and learning module 91 may learn a user's intent based on at least one data. The at least one data may further include at least one sensing data obtained by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a voice recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI processor 74 may detect presence of a speech from the input audio signal. According to an embodiment the AI processor 74 differentiates a speech data and a non-speech data using a deep neural networks (DNN) model. In addition, the AI processor 74 may perform emotion classification information on the speech data using the DNN model. According to the emotion classification information, the speech data may be classified as anger, boredom, fear, happiness, or sadness.

The contest fusion and learning module 91 may include a DNN model to perform the above-described operation, and may determine intent of a user input based on sensing information collected in the DNN model, the client device or the cloud environment.

The at least one data is merely an example and may include any data that can be referred to so as to determine intent of a user in a speech processing procedure. The at least one data may be obtained through the above-described DNN model.

The AI processor 74 may include the local knowledge 92. The local knowledge 92 may include user data. The user data may include a user's preference, the user's address, the user's initially set language, the user's contact list, etc. According to an embodiment, the AI processor 74 may additionally define the user's intent by complementing information included in the user's speech input using the user's specific information. For example, in response to the user's request "Invite my friends to my birthday party", the AI processor 74 does not request more clarified information from the user and may utilize the local knowledge 92 to determine who "the friends" are and when and where the "birthday" takes place.

The AI processor 74 may further include the dialogue management 93. The AI processor 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

I. Voice Recognizing Method

FIG. 10 is a flowchart illustrating a voice recognizing method according to an embodiment of present disclosure.

As illustrated in FIG. 10, according to the embodiment of present disclosure, the voice recognizing apparatus 10 of FIGS. 4 and 6 may perform the voice recognizing method S100 of FIG. 10. A detailed description thereof is as follows.

First, the voice recognizing apparatus may learn the noise-sensitivity model in a plurality of noise environments at step S110. Here, the plurality of noise environments may mean different environments where different noise levels are measured.

Next, the voice recognizing apparatus 10 may acquire a first noise level for a current environment at step S130. Here, the voice recognizing apparatus 10 may acquire a microphone detection signal by detecting an external signal through at least one microphone, and may acquire a first noise level by analyzing the noise section of the microphone detection signal.

Subsequently, the voice recognizing apparatus 10 may input a first noise level acquired in the current noise environment into the noise-sensitivity model learned in the plurality of noise environments, thus acquiring a first optimum sensitivity as the output value at step S150.

Finally, the voice recognizing apparatus 10 may set the first optimum sensitivity as the sensitivity of the voice recognition model (wakeup word recognition model), and may recognize a user's voice (wakeup word) using the voice recognition model (wakeup word recognition model) at step S170.

The above-described steps S110, S130, S150 and S170 may be performed by the processor 170 of the voice recognizing apparatus 10.

FIG. 11 is a flowchart illustrating a process of learning the noise-sensitivity model in various noise environments according to an embodiment of present disclosure.

When performing the noise-sensitivity model learning step S110 of FIG. 10, as illustrated in FIG. 11, the processor 170 may sequentially acquire a plurality of noise levels in a plurality of noise environments at step S111.

Subsequently, the processor 170 may acquire a plurality of optimum sensitivities corresponding to the plurality of noise levels, respectively, based on a voice recognition rate for external voice of the voice recognition model in each of the noise levels at step S113.

Finally, the processor 170 may learn/generate the noise-sensitivity model using the plurality of noise levels and the plurality of optimum sensitivity data sets at step S115.

FIG. 12 is a flowchart illustrating a process of acquiring a noise level in a current noise environment according to an embodiment of present disclosure.

When performing the first-noise-level acquiring step S130 of FIG. 10, as illustrated in FIG. 12, the processor 170 may first detect an external signal through at least one microphone (e.g. input unit 120) to acquire a microphone detection signal at step S131.

Subsequently, the processor 170 may analyze noise sections other than the voice section in the microphone detection signal at step S133.

Finally, the processor 170 may recognize the signal level in the noise section as the noise level at step S135.

FIG. 13 illustrates an example in which the voice recognizing apparatus according to an embodiment of present disclosure constitutes a voice recognition model optimized for the current noise environment.

As illustrated in FIG. 13, first, at a training step S110, the processor 170 may detect external sound through at least one microphone (e.g. input unit 120) to acquire a microphone detection signal. Particularly, the processor 170 may acquire a first microphone detection signal 1301 in a first noise environment, a second microphone detection signal 1302 in a second noise environment, a third microphone detection signal 1303 in a third noise environment, and a fourth microphone detection signal 1304 in a fourth noise environment through at least one microphone.

As described above, the first to fourth noise environments may mean environments where different noise levels are acquired, a laboratory environment, or an environment in which the voice recognizing apparatus 10 as an IoT device is located.

After acquiring the first microphone detection signal, the second microphone detection signal, the third microphone detection signal, and the fourth microphone detection signals 1301, 1302, 1303 and 1304, the processor 170 may acquire noise-sensitivity data sets 1311, 1312, 1313 and 1314 to learn the voice recognition model in each noise environment based on each of the first microphone detection signal, the second microphone detection signal, the third microphone detection signal, and the fourth microphone detection signal 1301, 1302, 1303 and 1304.

To be more specific, the processor may acquire each microphone detection signal, and then may acquire the noise level in each noise environment using each microphone detection signal. To be more specific, the processor may acquire the first noise level (noise A) of the first noise environment using the first microphone detection signal acquired in the first noise environment. Furthermore, the processor may acquire the second noise level (noise B) of the second noise environment using the second microphone detection signal acquired in the second noise environment. Furthermore, the processor may acquire the third noise level (noise C) of the third noise environment using the third microphone detection signal acquired in the third noise environment. The processor may acquire the fourth noise level (noise D) of the fourth noise environment using the fourth microphone detection signal acquired in the fourth noise environment.

After acquiring the noise level in each noise environment, the processor may acquire the optimum sensitivity based on a different recognition rate for voice in each noise environment. For example, after acquiring the first noise level in the first noise environment, the processor may acquire a first optimum sensitivity (sensitivity 10) based on a first voice recognition rate in the first noise environment acquiring the first noise level. For example, after acquiring the second noise level in the second noise environment, the processor may acquire a second optimum sensitivity (sensitivity 15) based on a second voice recognition rate in the second noise environment acquiring the second noise level. For example, after acquiring the third noise level in the third noise environment, the processor may acquire a third optimum sensitivity (sensitivity 20) based on a third voice recognition rate in the third noise environment acquiring the third noise level. For example, after acquiring the fourth noise level in the fourth noise environment, the processor may acquire a fourth optimum sensitivity (sensitivity 25) based on a fourth voice recognition rate in the fourth noise environment acquiring the fourth noise level.

After acquiring the noise-sensitivity data set in each noise environment, the processor may learn the noise-sensitivity model 1320 of the voice recognizing apparatus 10 using the plurality of noise-sensitivity data sets 1311, 1312, 1313 and 1314. For example, the processor may generate/learn the noise-sensitivity model 1320 using the first noise level-first optimum sensitivity data set 1311 acquired in the first noise environment, the second noise level-second optimum sensitivity data set 1312 acquired in the second noise environment, the third noise level-third optimum sensitivity data set 1313 acquired in the third noise environment, and the fourth noise level-fourth optimum sensitivity data set 1314 acquired in the fourth noise environment.

As described above, the noise-sensitivity model 1320 may be included in at least one of the memory 25 of FIG. 5, the deep learning model 26 of FIG. 6 and the memory 140.

Next, at operating steps (S130 to S170 of FIG. 10) of the voice recognizing apparatus, the processor may first detect an external signal through at least one microphone in a current noise environment to acquire the microphone detection signal 1305 in the current noise environment.

Here, the current noise environment may mean a space where the voice recognizing apparatus 10 is currently located or a space in which the voice recognizing apparatus 10 as an IoT device is located.

Subsequently, the processor may analyze non-voice sections 1305A, namely, sections other than the voice section of the microphone detection signal 1305, which is acquired through at least one microphone. After analyzing the non-voice sections 1305A, namely, sections other than the voice section of the microphone detection signal 1305, which is acquired through at least one microphone, the processor may measure the signal level of the noise section and then recognize the signal level of the measured noise section as the noise level in the current noise environment.

Subsequently, the processor may input the measured noise level into the noise-sensitivity model 1320 to acquire the optimum sensitivity ("optimum sensitivity 15") optimized for the current noise environment, as the output value.

Subsequently, the processor may set the sensitivity of the wakeup word recognition model 1330 using the acquired optimum sensitivity.

Finally, the processor may recognize a user's wakeup word/voice using the wakeup word recognition model 1330 whose sensitivity is set to the optimum sensitivity.

FIG. 14 is a flowchart illustrating an example of performing the process of FIG. 13 through a 5G network.

First, the voice recognizing apparatus 10 or the processor 170 of the voice recognizing apparatus may control the communication unit 110 to transmit the characteristic value extracted from the acquired first noise level to the AI processor included in the 5G network. Furthermore, the processor 170 may control the communication unit 110 to receive the AI processed information from the AI processor.

The AI processed information may include the first optimum sensitivity (value) acquired by inputting the first noise level into the voice recognition model.

Meanwhile, the processor 170 may perform the initial access procedure with the 5G network to transmit the characteristic value extracted from the first noise level to the 5G network. The processor 170 may perform the initial access procedure with the 5G network based on the SSB (Synchronization signal block).

Furthermore, the processor 170 may receive the DCI (Downlink Control Information), used to schedule the transmission of the characteristic value extracted from the first noise level through the wireless communication unit, from the network.

The processor 170 may transmit the characteristic value extracted from the first noise level to the network based on the DCI.

The processor 170 may transmit the characteristic value extracted from the first noise level through the PUSCH to the network, and the SSB and the DM-RS of the PUSCH may be quasi co-located (QCL) for a QCL type D.

Subsequently, the voice recognizing apparatus 10 may transmit the characteristic value extracted from the first noise level to the 5G network at step S1410.

Here, the 5G network may include the AI processor or the AI system, and the AI system of the 5G network may perform the AI processing based on the received characteristic value at step S1420.

First, the AI system may input characteristic values received from the voice recognizing apparatus 10 into the noise-sensitivity model at step S1421.

The AI system may acquire the first optimum sensitivity corresponding to the current noise level as the output value of the noise-sensitivity model at step S1422. The 5G network may transmit the first optimum sensitivity determined by the AI system through the communication unit to the voice recognizing apparatus 10 at step S1430.

Subsequently, the voice recognizing apparatus may set the sensitivity of the voice recognition model to the first optimum sensitivity received from the 5G network at step S1440.

Finally, the voice recognizing apparatus may recognize a user's voice/wakeup word using the voice recognition model (wakeup word recognition model) in the state where the sensitivity is set to the first optimum sensitivity at step S1450.

Meanwhile, the voice recognizing apparatus 10 may transmit only the first noise level to the 5G network, and may extract the characteristic value corresponding to an input that is to be used as the input of the artificial neural network for determining the first optimum sensitivity from the first noise level in the AI system included in the 5G network.

J. Summary of Embodiments

Embodiment 1

A method for intelligently recognizing voice by a voice recognizing apparatus in various noise environments, the method includes acquiring a first noise level for an environment in which the voice recognizing apparatus is located; inputting the first noise level into a previously learned noise-sensitivity model to acquire a first optimum sensitivity; and recognizing a user's voice based on the first optimum sensitivity, wherein the noise-sensitivity model is learned in a plurality of noise environments acquiring different noise levels.

Embodiment 2

The method of embodiment 1 may further include acquiring a plurality of noise-sensitivity data sets acquired from the plurality of noise environments; and learning the noise-sensitivity model using the plurality of noise-sensitivity data sets.

Embodiment 3

In the method of embodiment 2, the acquiring of the plurality of noise-sensitivity data sets may include acquiring a plurality of noise levels in the plurality of noise environments; acquiring a plurality of voice recognition rates for external voice of the voice recognizing apparatus in each of the plurality of noise levels; acquiring a plurality of optimum sensitivities corresponding to the plurality of noise levels, respectively, based on the plurality of voice recognition rates; and configuring the plurality of noise-sensitivity data sets using the plurality of noise levels and the plurality of optimum sensitivities.

Embodiment 4

In the method of embodiment 1, the acquiring of the first noise level may include acquiring a microphone detection signal through at least one microphone of the voice recognizing apparatus; determining a signal level at a noise section in the microphone detection signal; and acquiring the signal level at the noise section as the first noise level.

Embodiment 5

In the method of embodiment 4, the noise section may include sections other than a voice section where the user's voice is detected in the microphone detection signal.

Embodiment 6

The method of embodiment 1 may further include receiving a Downlink Control Information (DCI) used to schedule transmission of the first noise level from a network; and transmitting the first noise level to the network based on the DCI.

Embodiment 7

The method of embodiment 6 may further include performing an initial access procedure with the network based on a synchronization signal block (SSB); and transmitting the first noise level through a PUSCH to the network, wherein the SSB and a DM-RS of the PUSCH are quasi-co located for a QCL type D.

Embodiment 8

The method of embodiment 6 may further include controlling a communication unit of the voice recognizing apparatus to transmit the first noise level to an AI processor included in the network; and controlling the communication unit to receive information that is AI processed from the AI processor, wherein the AI processed information may include the first optimum sensitivity determined based on the first noise level.

Embodiment 9

A voice recognizing apparatus for intelligently recognizing voice in various noise environments may include a communication unit; at least one microphone; and a processor acquiring a first noise level for an environment in which the voice recognizing apparatus is located using the at least one microphone, inputting the first noise level into a previously learned noise-sensitivity model to acquire a first optimum sensitivity, and recognizing a user's voice based on the first optimum sensitivity, wherein the noise-sensitivity model is learned in a plurality of noise environments acquiring different noise levels.

Embodiment 10

In the apparatus of embodiment 9, the processor may acquire a plurality of noise-sensitivity data sets acquired from the plurality of noise environments, and may learn the noise-sensitivity model using the plurality of noise-sensitivity data sets.

Embodiment 11

In the apparatus of embodiment 10, the processor may acquire a plurality of noise levels in the plurality of noise environments, acquire a plurality of voice recognition rates for external voice of the voice recognizing apparatus in each of the plurality of noise levels, acquire a plurality of optimum sensitivities corresponding to the plurality of noise levels, respectively, based on the plurality of voice recognition rates, and configure the plurality of noise-sensitivity data sets using the plurality of noise levels and the plurality of optimum sensitivities.

Embodiment 12

In the apparatus of embodiment 9, the processor may acquire a microphone detection signal through at least one microphone of the voice recognizing apparatus, determine a signal level at a noise section in the microphone detection signal, and acquire the signal level at the noise section as the first noise level.

Embodiment 13

In the apparatus of embodiment 12, the noise section may include sections other than a voice section where the user's voice is detected in the microphone detection signal.

Embodiment 14

In the apparatus of embodiment 9, the processor may receive a Downlink Control Information (DCI), used to schedule transmission of the first noise level acquired from an input unit provided in the voice recognizing apparatus through the communication unit, from a network, and transmit the first noise level through the communication unit to the network based on the DCI.

Embodiment 15

In the apparatus of embodiment 14, the processor may perform an initial access procedure with the network based on a synchronization signal block (SSB) through the communication unit, and transmit the first noise level through a PUSCH to the network through the communication unit, and the SSB and a DM-RS of the PUSCH may be quasi-co located for a QCL type D.

Embodiment 16

In the apparatus of embodiment 14, the processor may control a communication unit to transmit the first noise level to an AI processor included in the network, and control the communication unit to receive information that is AI processed from the AI processor, and the AI processed information may include the first optimum sensitivity determined based on the first noise level.

Embodiment 17

A non-transitory computer readable medium storing a computer executable component configured to execute in at least processor of a computing device acquires a first noise level for an environment in which the voice recognizing apparatus is located using at least one microphone, inputs the first noise level into a previously learned noise-sensitivity model to acquire a first optimum sensitivity, and recognizes a user's voice based on the first optimum sensitivity, wherein the noise-sensitivity model is learned in a plurality of noise environments acquiring different noise levels.

The above-described present disclosure may be embodied as a computer readable code on a medium on which a program is recorded. The computer readable medium includes all kinds of recording devices in which data that can be read by the computer system is stored. Examples of the computer readable medium include Hard Disk Drives (HDD), Solid State Disks (SSD), Silicon Disk Drives (SDD), ROMs, RAMs, CD-ROMs, magnetic tapes, floppy disks, optical data storages and others. Furthermore, the computer readable medium may be embodied in the form of a carrier wave (e.g. transmission via the Internet). Therefore, the above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The effects of the intelligent voice recognizing method, the intelligent voice recognizing apparatus and the intelligent computing device according to an embodiment of present disclosure will be described below.

Present disclosure has an advantage in that it is possible to accurately acquire optimum sensitivity corresponding to a noise level depending on an operating state when an IoT device (voice recognizing apparatus) is in operation.

Present disclosure also has an advantage in that it is possible to set a recognition rate of a voice recognition model depending on a current noise environment using optimum sensitivity acquired in various noise environments.

Furthermore, present disclosure has an advantage in that it is possible to accurately recognize a user's voice in any noise environment, by learning an optimized voice recognition model in a current noise environment based on a recognition rate depending on the current noise environment.

The effects of present disclosure are not limited to the effects described above and other effects can be clearly understood by those skilled in the art from the following description.

What is claimed is:

1. A method for intelligently recognizing voice by a voice recognizing apparatus in various noise environments, the method comprising:
   acquiring a first noise level for an environment in which the voice recognizing apparatus is located;
   inputting the first noise level into a previously learned noise-sensitivity model to acquire a first optimum sensitivity; and
   recognizing a user's voice based on the first optimum sensitivity,
   wherein the previously learned noise-sensitivity model is learned in a plurality of noise environments acquiring different noise levels,
   wherein the method further comprises:
   acquiring a plurality of noise-sensitivity data sets acquired from the plurality of noise environments; and
   learning the noise-sensitivity model using the plurality of noise-sensitivity data sets to generate the previously learned noise-sensitivity model.

2. The method of claim 1, wherein the acquiring of the plurality of noise-sensitivity data sets comprises:
   acquiring a plurality of noise levels in the plurality of noise environments;
   acquiring a plurality of voice recognition rates for external voice of the voice recognizing apparatus in each of the plurality of noise levels;
   acquiring a plurality of optimum sensitivities corresponding to the plurality of noise levels, respectively, based on the plurality of voice recognition rates; and
   configuring the plurality of noise-sensitivity data sets using the plurality of noise levels and the plurality of optimum sensitivities.

3. The method of claim 1, wherein the acquiring of the first noise level comprises:
   acquiring a microphone detection signal through at least one microphone of the voice recognizing apparatus;
   determining a signal level at a noise section in the microphone detection signal; and
   acquiring the signal level at the noise section as the first noise level.

4. The method of claim 3, wherein the noise section comprises sections other than a voice section where the user's voice is detected in the microphone detection signal.

5. The method of claim 1, further comprising:
   receiving a Downlink Control Information (DCI) used to schedule transmission of the first noise level from a network; and
   transmitting the first noise level to the network based on the DCI.

6. The method of claim 5, further comprising:
   performing an initial access procedure with the network based on a synchronization signal block (SSB); and
   transmitting the first noise level through a PUSCH to the network,
   wherein the SSB and a DM-RS of the PUSCH are quasi-co located for a QCL type D.

7. The method of claim 5, further comprising:
   controlling a transceiver of the voice recognizing apparatus to transmit the first noise level to an artificial intelligence (AI) processor included in the network; and
   controlling the transceiver to receive information that is AI processed from the AI processor,
   wherein the AI processed information comprises the first optimum sensitivity determined based on the first noise level.

8. The method of claim 1, further comprising:
   comparing the first noise level to the different noise levels corresponding to the plurality of noise environments in the previously learned noise-sensitivity model;
   identifying a most similar one of the plurality of noise environments in the previously learned noise-sensitivity model having a noise level corresponding to the first noise level of the environment in which the voice recognizing apparatus is located;
   setting the first optimum sensitivity for recognizing the user's voice equal to a sensitivity of the most similar one of the plurality of noise environments in the previously learned noise-sensitivity model; and
   recognizing the user's voice using the first optimum sensitivity.

9. A voice recognizing apparatus for intelligently recognizing voice in various noise environments, the voice recognizing apparatus comprising:
   a transceiver;
   at least one microphone; and a processor configured to:
acquire a first noise level for an environment in which the voice recognizing apparatus is located using the at least one microphone,
input the first noise level into a previously learned noise-sensitivity model to acquire a first optimum sensitivity, and
recognize a user's voice based on the first optimum sensitivity,
wherein the previously learned noise-sensitivity model is learned in a plurality of noise environments acquiring different noise levels, and
wherein the processor is configured to:
acquire a plurality of noise-sensitivity data sets acquired from the plurality of noise environments, and
learn the noise-sensitivity model using the plurality of noise-sensitivity data sets to generate the previously learned noise-sensitivity model.

10. The voice recognizing apparatus of claim 9, wherein the processor is configured to:
acquire a plurality of noise levels in the plurality of noise environments, acquires a plurality of voice recognition rates for external voice of the voice recognizing apparatus in each of the plurality of noise levels,
acquire a plurality of optimum sensitivities corresponding to the plurality of noise levels, respectively, based on the plurality of voice recognition rates, and
configure the plurality of noise-sensitivity data sets using the plurality of noise levels and the plurality of optimum sensitivities.

11. The voice recognizing apparatus of claim 9, wherein the processor is configure to:
acquire a microphone detection signal through at least one microphone of the voice recognizing apparatus,
determine a signal level at a noise section in the microphone detection signal, and
acquire the signal level at the noise section as the first noise level.

12. The voice recognizing apparatus of claim 11, wherein the noise section comprises sections other than a voice section where the user's voice is detected in the microphone detection signal.

13. The voice recognizing apparatus of claim 9, wherein the processor is configured to:
receive a Downlink Control Information (DCI), used to schedule transmission of the first noise level acquired from at least one microphone provided in the voice recognizing apparatus through the transceiver, from a network, and
transmit the first noise level through the transceiver to the network based on the DCI.

14. The voice recognizing apparatus of claim 13, wherein the processor is configured to:
perform an initial access procedure with the network based on a synchronization signal block (SSB) through the transceiver, and
transmit the first noise level through a PUSCH to the network through the transceiver, and the SSB and a DM-RS of the PUSCH are quasi-co located for a QCL type D.

15. The voice recognizing apparatus of claim 13, wherein the processor is configured to:
control a transceiver to transmit the first noise level to an artificial intelligence (AI) processor included in the network, and
control the transceiver to receive information that is AI processed from the AI processor, and the AI processed information comprises the first optimum sensitivity determined based on the first noise level.

16. The voice recognizing apparatus of claim 9, wherein the processor is configured to:
compare the first noise level to the different noise levels corresponding to the plurality of noise environments in the previously learned noise-sensitivity model;
identify a most similar one of the plurality of noise environments in the previously learned noise-sensitivity model having a noise level corresponding to the first noise level of the environment in which the voice recognizing apparatus is located;
set the first optimum sensitivity for recognizing the user's voice equal to a sensitivity of the most similar one of the plurality of noise environments in the previously learned noise-sensitivity model; and
recognize the user's voice using the first optimum sensitivity.

17. A non-transitory computer readable medium storing therein a computer executable component configured to execute in at least one processor of a computing device,
wherein the computer executable component acquires a first noise level for an environment in which the voice recognizing apparatus is located using at least one microphone, inputs the first noise level into a previously learned noise-sensitivity model to acquire a first optimum sensitivity, and recognizes a user's voice based on the first optimum sensitivity,
wherein the previously learned noise-sensitivity model is learned in a plurality of noise environments acquiring different noise levels, and
wherein the noise-sensitivity model is learned using the plurality of noise-sensitivity data sets acquired from the plurality of noise environments to generate the previously learned noise-sensitivity model.

18. The non-transitory computer readable medium of claim 17, wherein the computer executable component:
compares the first noise level to the different noise levels corresponding to the plurality of noise environments in the previously learned noise-sensitivity model;
identifies a most similar one of the plurality of noise environments in the previously learned noise-sensitivity model having a noise level corresponding to the first noise level of the environment in which the voice recognizing apparatus is located;
sets the first optimum sensitivity for recognizing the user's voice equal to a sensitivity of the most similar one of the plurality of noise environments in the previously learned noise-sensitivity model; and
recognizes the user's voice using the first optimum sensitivity.

* * * * *